United States Patent
Emerson

(10) Patent No.: US 12,282,312 B2
(45) Date of Patent: Apr. 22, 2025

(54) ROBOT STAGING AREA MANAGEMENT

(71) Applicant: Yokogawa Electric Corporation, Tokyo (JP)

(72) Inventor: David Emerson, Coppell, TX (US)

(73) Assignee: Yokogawa Electric Corporation, Tokyo (JP)

( * ) Notice: Subject to any disclaimer, the term of this patent is extended or adjusted under 35 U.S.C. 154(b) by 298 days.

(21) Appl. No.: 17/942,835

(22) Filed: Sep. 12, 2022

(65) Prior Publication Data

US 2024/0094712 A1 Mar. 21, 2024

(51) Int. Cl.
*G05B 19/418* (2006.01)
*G05D 1/00* (2024.01)
*G06Q 10/0631* (2023.01)

(52) U.S. Cl.
CPC ..... *G05B 19/41835* (2013.01); *G05D 1/0297* (2013.01); *G06Q 10/0631* (2013.01); *G05B 2219/50391* (2013.01)

(58) Field of Classification Search
CPC ... B25J 9/16; B25J 9/1682; B25J 19/00; B25J 19/005; G05B 19/41835; G05B 2219/40298; G05B 2219/50391; G05D 1/0297; G05D 1/692; G05D 1/6987; G05D 2105/45; G05D 2105/89; G05D 2107/70; G06Q 10/0631
See application file for complete search history.

(56) References Cited

U.S. PATENT DOCUMENTS

| | | | |
|---|---|---|---|
| 10,089,586 B2 | 10/2018 | Vestal et al. | |
| 10,093,526 B2 | 10/2018 | D'andrea | |
| 10,761,539 B2 | 9/2020 | Moore et al. | |
| 11,513,521 B1* | 11/2022 | Konrardy | B60R 25/10 |
| 2011/0010624 A1 | 1/2011 | Vanslette et al. | |
| 2014/0100693 A1* | 4/2014 | Fong | G05D 1/0274 |
| | | | 700/253 |

(Continued)

FOREIGN PATENT DOCUMENTS

| | | |
|---|---|---|
| JP | 2017130045 | 7/2017 |
| JP | 2020204992 | 12/2020 |
| WO | 2017067810 | 4/2017 |

OTHER PUBLICATIONS

"Discover Spot Robot" Intuitive Robots. 2022, 4 pages. Retrieved from https://www.intuitive-robots.com/spot-robot/ Jun. 23, 2022.

(Continued)

*Primary Examiner* — Jason Holloway
*Assistant Examiner* — Blake A Wood
(74) *Attorney, Agent, or Firm* — Gray Ice Higdon

(57) ABSTRACT

Implementations are described herein for managing mobile robots in a robot staging area. In various implementations, a state of a mobile robot transitioning from a production mode to a staging mode may be determined. A state of a plurality of robot staging stations may also be determined. The plurality of robot staging stations may include at least one each of a charging station and a maintenance station. Based at least in part on the determined states of the mobile robot and plurality of robot staging stations, a robot staging station may be selected from the plurality of robot staging stations. The mobile robot may be assigned a staging mission, which may cause the mobile robot to travel to the selected robot staging station.

17 Claims, 18 Drawing Sheets

(56) References Cited

U.S. PATENT DOCUMENTS

| | | | |
|---|---|---|---|
| 2015/0298565 A1* | 10/2015 | Iwamura | G06Q 10/04 |
| | | | 701/22 |
| 2018/0304759 A1 | 10/2018 | Chase et al. | |
| 2020/0204992 A1 | 6/2020 | Sawaki | |
| 2021/0072758 A1* | 3/2021 | Kim | B60N 2/002 |
| 2021/0124180 A1 | 4/2021 | Amadio | |
| 2022/0194245 A1* | 6/2022 | Gonano | G05D 1/0214 |

OTHER PUBLICATIONS

Spot User Guide. Boston Dynamics. Release 2.0, Version A. 55 pages, dated 2019.
About the Spot Dock self-charging station. Introduction to the self-charging station system and components. Retrieved from https://support.bostondynamics.com/s/article/About-the-Spot-Dock-self-charging-station. 8 pages, dated Dec. 7, 2021.
Japan Patent Office; Notice of Allowance issued for Application No. 2023-147589, 6 pages, dated Sep. 11, 2020.
Japan Patent Office; Notice of Refusal issued for Application No. 2023-147589, 6 pages, dated Jun. 4, 2024.

\* cited by examiner

ROBOT STAGING AREA MANAGEMENT

BACKGROUND

A complex industrial facility such as a petrochemical refinery, chemical plant, etc., may include myriad components that require regular inspection and/or maintenance. These tasks, which traditionally have been performed by humans, can be tedious, repetitive, error prone, and even dangerous. For example, many process automation facilities include areas that pose increased risks to human personnel and/or of accidents, such as explosion-proof ("ex-proof") areas. Many of these inspection and maintenance tasks are increasingly being delegated to robots, including ground-based robots and unmanned aerial vehicles (UAVs). However, this increasing reliance on robots also introduces various challenges, such as how to keep a fleet of robots in working order efficiently and effectively, with minimal disruption of the robots' duties.

For example, it may be possible to keep all robots of a process automation facility sufficiently charged by implementing a one-to-one correspondence of charging stations and robots, so that each robot can go to its associated charging station at any time to recharge its battery. However, this may result in many charging stations being unused much of the time, draining resources unnecessarily and wasting space. Similarly, resources such as power may be expended to maintain an entire fleet of robots at the highest level of capability, without consideration for the level of capability suited for the tasks to be completed by the robot fleet. Further still, it is likely that many production missions will have dedicated start or end points, from which a robot will begin or conclude its production mission. Inefficiently organizing the position of each robot in the fleet may lead to excess storage requirements and clogged robot pathways. Further still, within a robot staging area (also referred to as a "robot yard"), the robots are likely to encounter more robots than in the operational area of a process automation facility, raising additional challenges.

SUMMARY

There is a need to orchestrate a fleet of robots so that a capable robot is available when needed to complete an operational mission, while minimizing expended resources and disruption to other robots. Additionally, there is a need to integrate management of a fleet of robots with the management of a facility, such that the direction of the robots is carried out efficiently, to limit the number of robots and/or stations in a facility. Moreover, there is a need for a management system to determine what resources are necessary to keep the facility running, without simply applying the most resources to every robot.

For example, instead of charging batteries when a robot's charge level falls below some pre-set threshold, techniques described herein allow for determining the battery level necessary for completion of task(s) at the industrial facility, based on expected demand and expected availability of other robots, and charging the robot in a manner promoting overall efficiency, such as when necessary for the robot to complete a task or when costs associated with charging are reduced. As another example, instead of repairing a mobile robot anytime it fails some static performance benchmark, implementations described herein apply asset monitoring strategies to predict failure or underperformance, based on expected tasks and expected availability of other robots; the robot may be sent to a repair/maintenance robot staging station to be repaired if necessary. As yet another example, when moving robots out of the way of other robots, techniques described herein move particular robots to position(s) prioritized for production missions.

In various implementations, a "robot staging area" or "robot yard" may be declared or otherwise defined. A robot staging area may be an area of an industrial facility in which mobile robots are stored while not executing production missions. The robot staging area may include multiple different types of robot staging stations to provide different services to mobile robot. These services may include, but are not limited to, charging, repair/maintenance, updating firmware and software, payload alteration (e.g., "retooling"), storage, production mission starting point stations, and so forth.

In various implementations, a robotics management system may include or be operably coupled with a robotics staging system. The robotics management system may be configured to manage the fleet of mobile robots to perform various production missions in the industrial facility based on needs of the facility, a schedule, human requests, etc. These production missions may include, for instance, inspecting and/or repairing sensors and/or actuators, clearing blockages, inspecting other aspects of the industrial facility (e.g., monitor chimney flame), performing various maintenance or cleaning tasks, or any other task that can be performed by a mobile robot in a production area of an industrial facility.

The robotics staging system, by contrast, may be configured to manage the robot fleet within the robot staging area, to ensure efficient and effective charging, repair, maintenance, storage, as well as to make the most efficient use of the space and robot staging stations of the robot staging area. In various implementations, when a robot transitions from a production mode to a staging mode, e.g., by entering the robot staging area after completing a production mission in the production area, the robotics management system may execute a handover of control to the robotics staging system. In various implementations, this handover may include a diagnostic checkup to identify a current state of the incoming robot. Based on information gleaned from this diagnostic checkup, the robotics management system and/or robotics staging system may identify any actions to be taken to prepare the robot for future mission(s).

In some implementations, the robotics staging system may retrieve information from the robotics management system about the robots themselves (e.g., battery life, location, various robot health characteristics) and (2) missions that the robots may be assigned. Based on this retrieved information, the robotics staging system may manage the robots in the robot staging area. The robotics staging system's management of the robots in the robot staging area may include, for instance: determining whether a robot needs to charge, and if so, if the robot needs to move to a charging robot staging station; determining whether a robot needs to undergo maintenance (including predicting if and/or when the robot will need maintenance in the future), and if so, if the robot needs to move to a maintenance robot staging station; determining whether a robot needs to begin a production mission, and if so, which robot staging station is a suitable starting location for the production mission; determining whether a robot is not needed for any missions or other activity for at least a certain period of time, and if so, if the robot should move to a storage robot staging station; and/or determining whether other robots are in the way of a robot that needs to move to a location.

If the robotics staging system determines that movement of one or more of the robots within the robot staging area is required, the robotics staging system can generate one or more what will be referred to "staging missions." The robotics staging system may then assign staging missions to the relevant robot(s), so that the robot(s) will move within the robot staging area to the appropriate location at the appropriate time.

In various implementations, the robotics staging system may maintain a real-time record of the current location of each robot in the robot staging area. For example, the robotics staging system may receive real-time location information about the robots within the robot staging area and, in some cases, about robots in the production area of the industrial facility. If sufficient precision can be achieved, global position system (GPS) localization may be used. However, one advantage of having a defined robot staging area is that real-time location information may be more easily determined in a limited space and with higher precision using other localization techniques, such as cameras or other sensors in the robot staging area. In various implementations, a grid or other coordinate system may be virtually mapped over the robot staging area. In some implementations, the robot staging area may be digitized or simulated in the robotics staging system, with real-time updates generated regarding the robot positions. In various implementations, the robotics staging system may predict the future location of one or more robots. This may enable the robotics staging system to predict future conflicting mission paths and make adjustments to avoid collisions or other conflicts.

As a working example, suppose the robotics staging system determines that a robot needs to be charged, and therefore, that the robot needs to move to a charging robot staging station. The robotics staging system may receive real-time updates of the location of each robot in the robot staging area, as well as updates about each charging station in the robot staging area that is compatible with each robot. The robotics staging system may also connect to the robotics management system to gather diagnostic data about the robot, such as battery data. The robotics staging system may then compare the battery level to a threshold, which in some cases may be set based on the needs of an upcoming mission assigned to the robot. In other implementations, this comparison may be carried out by the robotics management system and communicated to the robotics staging system.

If the battery level is too low, the robotics staging system may generate a relocation staging mission by calculating the lowest cost path between the location of the robot and the location of a suitable charging station (e.g., with a charger that is compatible with the robot). The cost may be based on factors such as travel distance, energy used, obstacles to overcome, wear and tear to the robot, etc. Then, because the robotics staging system has the location of all the other robots in the yard, the robotics staging system may be able to identify other robots that are blocking, or will block, the path of the original robot under consideration. The robotics staging system may then calculate the cost of moving the obstacle robot vs the cost of asking the original robot to go around the obstacle robot. The robotics staging system may then assign relocation staging missions to achieve the lowest total cost to the robot fleet, or to optimize for another value.

The robotics staging system may make similar determinations as to whether: a robot should undergo maintenance, and if so, that the robot needs to move to a maintenance shop; whether a robot should begin a mission, and if so, that the robot needs to move to a location, e.g., a starting location for a mission; whether a robot is not needed for any missions or other activity for at least a certain period of time, and if so, that the robot should move to a storage location; or whether other robots are in the way of a robot that needs to move to a location.

In some implementations, each robot staging station in the robot staging area may include an output device such as a display for rendering a fiducial marker. A fiducial marker may be a point of reference or identifier used by the mobile robots in the robot staging area to identify a particular robot staging station. Fiducial markers may take various forms. Visual fiducial markers may take the form of bar codes or quick review (QR) codes, for instance. Invisible fiducial markers may include, for instance, infrared markers, laser guidance mechanisms, and so forth. In various implementations, a fiducial marker may be changed as appropriate to indicate a different location to a robot.

In various implementations, when a mobile robot is assigned a production mission (i.e., a mission to be executed in the facility, in contrast to a staging mission to be executed within the robot staging area), the production mission may include a starting point or location. In some cases this starting point may be located within the robot staging area at a specific mission start robot staging station. A specific robot, e.g., Robot A, may have a fiducial marker assigned to its mission start point. The robotics staging system may then assign the Robot A mission start fiducial to be rendered at the mission start station located within the robot staging area. Robot A may then be assigned a staging mission instructing Robot A to scan fiducial markers rendered at the plurality of robot staging stations within the robot staging area until locating the Robot A mission start fiducial marker. Robot A may then dock or otherwise position itself at the mission start robot staging station at which the Robot A mission start fiducial marker is rendered. In a similar manner, any robot may be instructed to identify and position itself at any of a plurality of robot staging stations in the robot staging area, as determined by the robotics staging system.

In some implementations, staging missions may be assigned to a robot as a series of fiducial markers, or may cause a single fiducial marker of the robot to be rendered at multiple different robot staging stations, e.g. in an ordered or unordered sequence. The robotics staging system may cause the fiducial markers to be rendered at each applicable robot staging station as needed. For example, a fiducial marker of a robot may first be rendered at the appropriate charging station, and may then at the appropriate docking station, or maintenance station, or storage station, as appropriate.

In some implementations, the robotics staging system may optimize the use of the robot staging stations within the robot staging area for a given purpose. For example, the robotics staging system may optimize use of the robot staging stations for charging to ensure that the greatest number of mobile robots are fully charged, or that the least number of robots have less than 50% charge remaining. In this example, the robotics staging system may assign fiducial markers to one or more charging stations, and assign staging missions to one or more mobile robots, so that the mobile robots reach an optimized level of charge. The robotics staging system may additionally or alternatively optimize for the number of robots available at a given time, or to meet a known schedule of production missions, based on how much charge is necessary for the mission, or if battery health concerns indicate that the robot should wait to be charged at a later time.

Techniques described herein provide for increased flexibility in optimizing a robot fleet while those robots wait to be deployed from the robot staging area. As the number of robot missions increases, efficiencies may be achieved in how the robot fleet is managed when not every robot is actively conducting a production mission in the industrial facility. This may allow the robotics staging system to reduce the total number of robots necessary to service an industrial facility because the robots are more often charged, well-maintained, and ready for deployment. Similarly, the robotics staging system may limit the number of robot staging stations necessary to service the robot fleet because each station is more flexibly used and less likely to be idle/empty. Moreover, the use of fiducial markers may limit the complexity of staging mission data provided to robots, e.g., enabling each robot to store a more limited set of fiducial markers.

In some implementations, when production missions are created by or via robotics management system, the robotics staging system may determine which mobile robot in the robot staging area should be assigned one or more of the production missions. In various implementations, the robotics staging system may make this determination based on information relating to the robots in the robot staging area. For example, if a given robot's battery level is low, or if the given robot's location would make it difficult for the given robot to execute a particular production mission, the robotics staging system may use that information to identify/select a different robot best suited for the production mission. The robotics staging system may also use this type of information to provide support to the robotics management system in determining which robot should be assigned which production mission.

Implementations described herein give rise to various additional technical benefits and advantages. Humans are not needed to manage or organize (e.g., store) idle robots not currently participating in missions. Automatically coordinating the storage and location of the robots in real time allows for more robots to be stored or accessed in less space. Moreover, by practicing selected aspects of the present disclosure to perform targeting robot maintenance, storage, and charging, robots are more efficiently and better prepared for when they are called upon to execute a production mission. For example, when a robot is needed to perform a production mission, it will already have been moved to an accessible (e.g., unobstructed) location, and will already have had its battery charged sufficiently to perform the production mission.

In various implementations, a method may be implemented using one or more processors and may include: determining a state of a mobile robot transitioning from a production mode to a staging mode; determining a state of a plurality of robot staging stations, wherein the plurality of robot staging stations includes at least one each of a charging station and a maintenance station; based at least in part on the determined states of the mobile robot and plurality of robot staging stations, selecting a robot staging station from the plurality of robot staging stations; and assigning the mobile robot a staging mission, wherein the staging mission causes the mobile robot to travel to the selected robot staging station.

In various implementations, the method may include causing an output device at the selected robot staging station to render fiducial output, wherein the staging mission causes the mobile robot to: scan the plurality of robot staging stations to detect the rendered fiducial output, and travel to the robot staging station at which the rendered fiducial output is detected. In various implementations, the output device may be a display, and the rendered fiducial output may be a visual fiducial marker.

In various implementations, the mobile robot may transition from the production mode to the staging mode when moving from a production area of an industrial facility to a robot staging area of the industrial facility that includes at least some of the plurality of robot staging stations. In various implementations, the method further includes: determining a state of one or more production missions that are performable by or assigned to the mobile robot, or that are assignable to one or more other mobile robots in a robot staging area that includes the plurality of robot staging stations; wherein the selecting is further based on the state of the one or more production missions.

In various implementations, one or more of the production missions may include one or more missions to inspect or service sensors or actuators of process automation components outside of the robot staging area. In various implementations, the selected robot staging station is selected based on being an available starting location of a first production mission of the production missions that is performable by or assigned to the mobile robot. In various implementations, the selecting includes comparing a time interval until a starting time of one of the production missions to a threshold.

In various implementations, the mobile robot may be a first mobile robot, and the selecting may include selecting the robot staging station further based on a determination that a first production mission of the plurality of production missions is to be performed by the first mobile robot conditionally, in dependence on a second production mission of the plurality of production missions that is or will be performed by a second mobile robot. In various implementations, the second production mission may include an inspection of a component of a process automation facility, and the first production mission may include one or more tasks that are performed conditionally based on an outcome of the inspection of the component.

In various implementations, the state of the robot may include available battery power of the robot and a configuration of the robot. In various implementations, at least one maintenance station within a robot staging area that includes at least some of the plurality of robot staging stations may include a payload alteration station configured for altering the configuration of the mobile robot.

In various implementations, the selected robot staging station may be a storage station that is selected based on the storage station being outside a present or future travel trajectory of another mobile robot in a robot staging area that includes at least some of the plurality of robot staging stations. In various implementations, the method may include performing a cost/benefit analysis to determine whether to relocate the mobile robot to the storage station or cause the another robot to alter the present or future trajectory of the another robot to circumvent the mobile robot.

In various implementations, the state of the mobile robot may include a first vector embedding and the state of the plurality of robot staging stations comprises a second vector embedding. In various implementations, the method may include processing the first and second vector embeddings based on a reinforcement learning policy to generate a probability distribution over a staging mission action space, wherein the selecting is based on the probability distribution.

In another aspect, a method implemented using one or more processors may include: determining a state of a plurality of robot staging stations within a robot staging area of an industrial facility, wherein the plurality of robot staging stations includes at least one each of a robot production mission starting point station and a robot storage station; determining a state of one or more production missions that are performable by or assignable to one or more mobile robots in the staging area; analyzing the determined states of the plurality of robot staging stations and the one or more production missions; and based on the analyzing, assigning a mobile robot within the robot staging area a staging mission that causes the mobile robot to travel to the robot storage station.

In addition, some implementations include one or more processors (e.g., central processing unit(s) (CPU(s)), graphics processing unit(s) (GPU(s)), and/or tensor processing unit(s) (TPU(s))) of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods. Yet other implementations include agricultural vehicles, such as robots, that are equipped with edge processor(s) configured to carry out selected aspects of the present disclosure.

DETAILED DESCRIPTION

Figure 1:
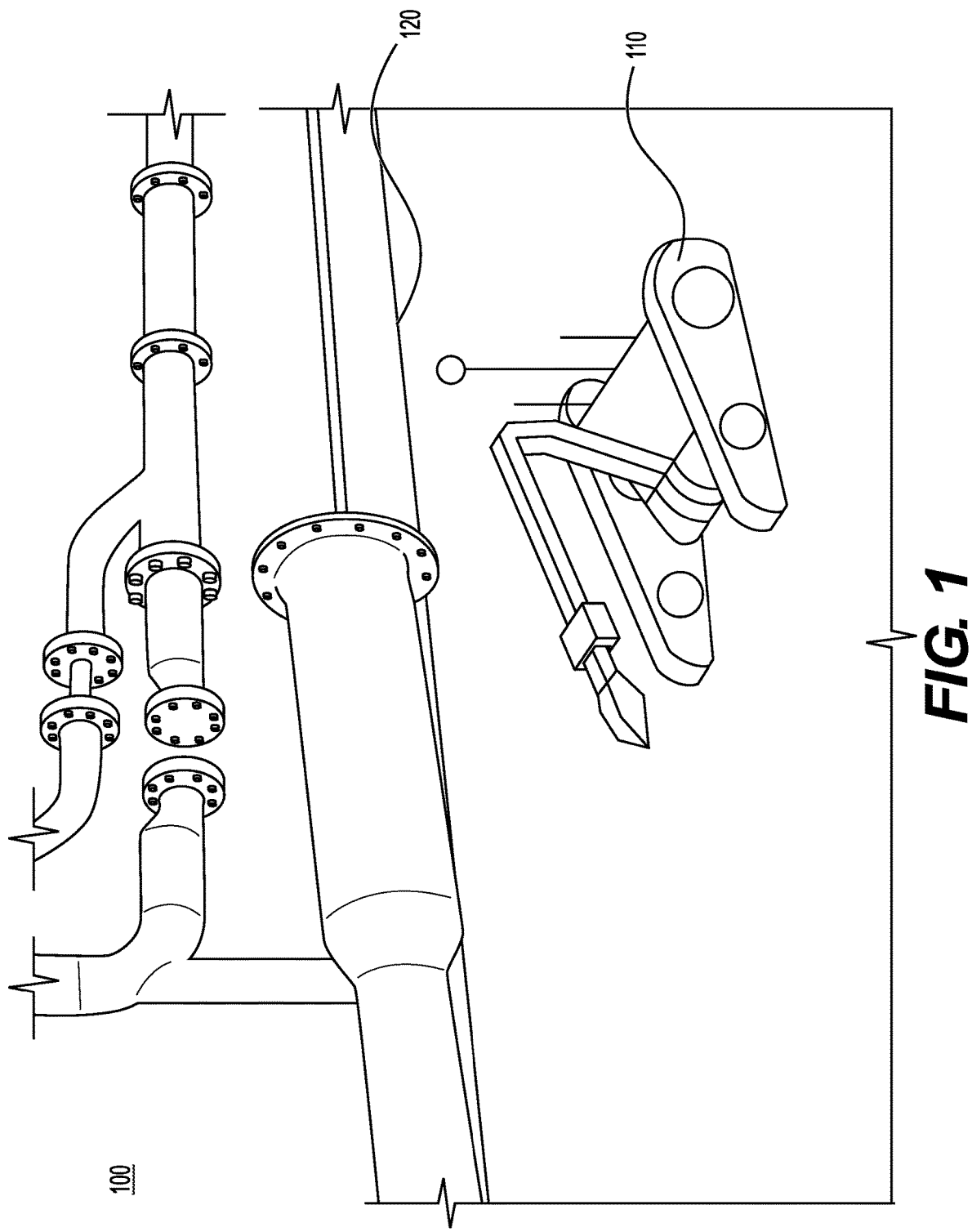
FIG. 1 depicts an exemplary mobile robot in an industrial facility setting 100.

FIG. 1 depicts such an exemplary mobile robot 110 in an industrial facility 120 of an industrial facility setting 100.

Figure 2:
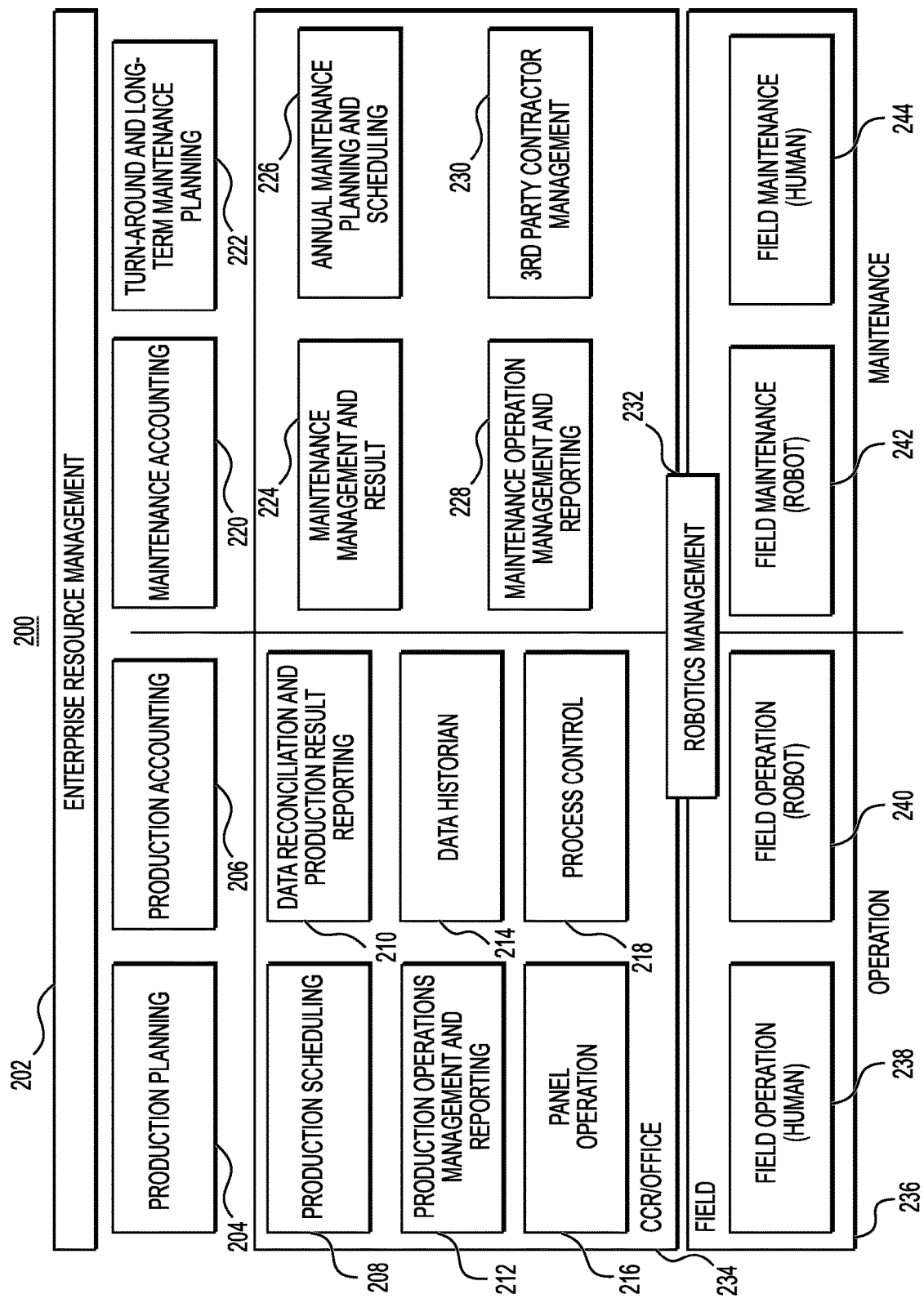
FIG. 2 depicts tasks and components of an operations management system for an industrial facility.

The operation of the industrial facility 120 may be controlled by an operations management system operated by one or more human operators. FIG. 2 depicts tasks and components of an operations management system 200 for the industrial facility 120.

Operation of industrial facility 120 may include tasks and components related to operation of the facility, monitoring of safety or other conditions within the facility, and maintenance of the facility. Overall operations may be managed by an enterprise resource management system 202, which may control tasks such as, for example, production planning 204, production accounting 206, maintenance accounting 220, and planning of both turn-around maintenance and long-term maintenance 222.

Tasks for the operation and maintenance of the industrial facility 120 may be performed in an operations office or central control room (CCR) 234, or in the field 236, such as within the production area of the industrial facility 120 itself.

Operations-related tasks performed within the office/CCR 234 may include, for example, production scheduling 208, data reconciliation and production result reporting 210, production operations management and reporting 212, a data historian 214, panel operation 216, and process control 218. Maintenance-related tasks performed within the office/CCR 234 may include, for example, maintenance and reliability management, and result reporting 224, annual maintenance planning and scheduling 226, maintenance operation management and reporting 228, and third party contractor management 230.

Operations-related tasks performed in the field 236 may include, for example, human-performed operations tasks 238 and robot-performed operations tasks 240. Maintenance-related tasks performed in the field 236 may include, for example, human-performed maintenance tasks 242, and robot-performed maintenance tasks 244. Robot-performed operations tasks 240 and robot-performed maintenance tasks 244, as well as other robot-performed tasks, may be managed by a robotics management system 232. Exemplary embodiments of one or more such robotics management systems will be discussed in greater detail below.

Figure 3:
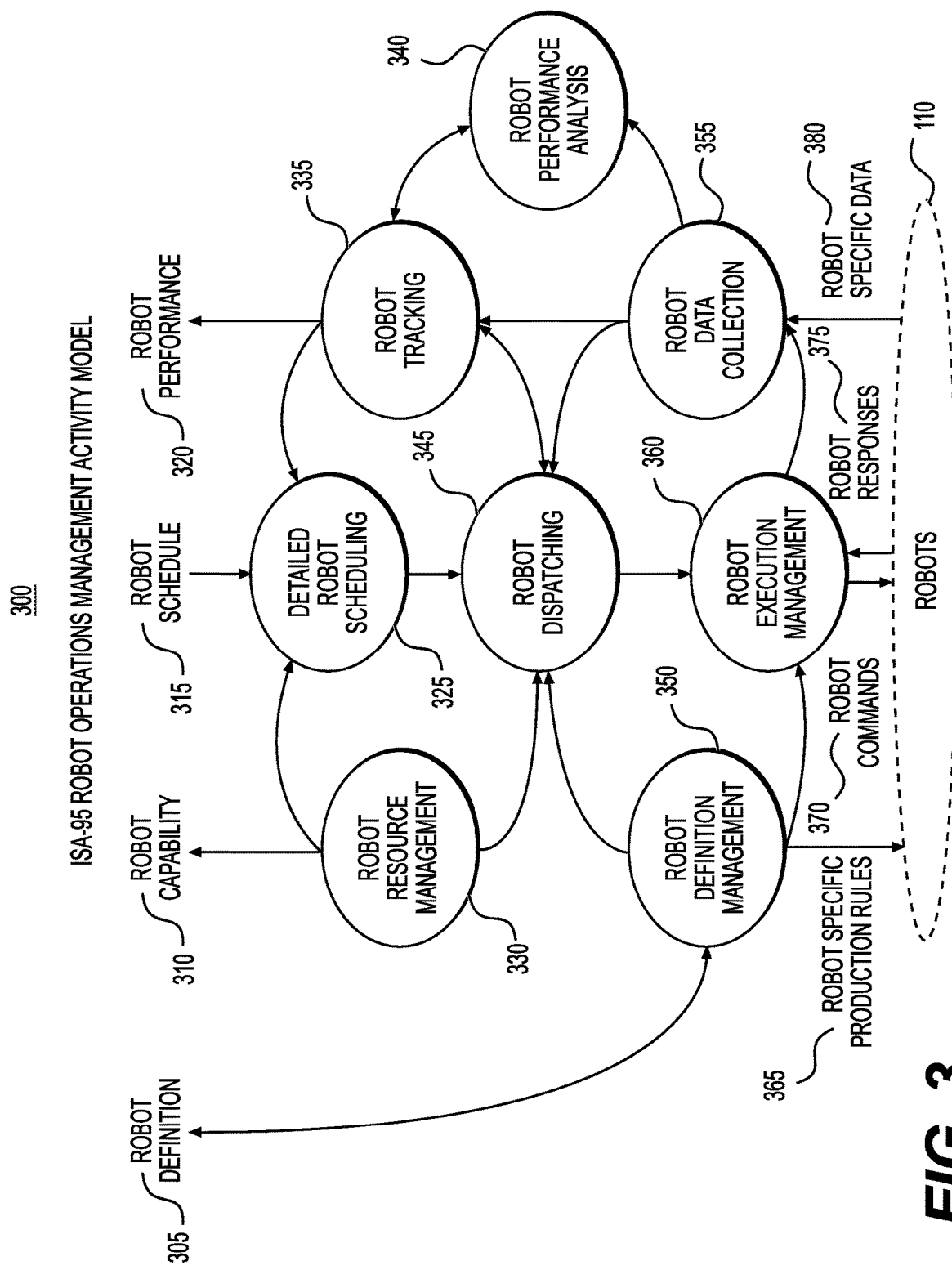
FIG. 3 depicts a generalized model of robotics activity within an operations management system.

Robots acting within an operations management system may require additional information and metadata about each of the robots and robot activities within the system, including robot management, tracking, and analysis of the robots and their activities. For example, robots may require information about other robots and their activities when multiple robots are cooperating on an activity or when the activities of multiple robots may conflict. FIG. 3 depicts a generalized model 300 of robotics activity within an operations management system, based on the ISA-95 standard for "Enterprise-Control System Integration" (https://www.isa.org/standards-and-publications/isa-standards/isa-standards-committees/isa95).

Management of robots 110 functioning within an industrial facility 120, including robot-performed operations tasks 240 and robot-performed maintenance tasks 244, may relate to activities performed by robots 110, data related to robots 110 and the tasks performed, operations performed by robotics management system 232, and communications between the robotics management system 232 and the robots 110. Such management may be structured according to model of robotics activity 300.

Data related to the robots 110 may include, for example, a robot definition 305 for each robot 110, a robot capability 310 for each robot 110, a robot schedule 315 for each robot 110, and robot performance metrics 320 for each robot 110.

Operations performed by robotics management system 232 may include, for example, robot resource management 330, robot definition management 350, detailed robot scheduling 325, robot dispatching 345, robot execution management 360, robot tracking 335, robot data collection 355, and robot performance analysis 340. In a system utilizing robots provided by multiple robot vendors, these operations may reflect differences between robots provided by different vendors. For example, each robot vendor may make data pertaining to each robot available in a different format particular to that robot or vendor. To address this, robotics management system 232 may standardize the data by pulling and interpreting a subset of data that may be relevant to a human operator. For instance, two robots from different vendors may each have an error in a mission relating to a blockage, but the robots may format and present that error in different ways depending on their platform. Robotics management system 232 may correctly interpret the differing information presented by robots from multiple vendors via adapters, such as robot-specific adapters 644 discussed below with respect to FIG. 6.

During robot resource management 330, robotics management system 232 may update or refer to robot capability information 310 to maintain information about available robot resources and make those resources available for robot-assigned tasks. For example, during the course of performing missions or tasks, the capabilities of a robot may temporarily change, such as the depletion of the robot's battery, damage or malfunction of one or more tools or sensors attached to the robot, removal or replacement of one or more tools or sensors attached to the robot, or other changes to a robot's capabilities. In addition, a robot may become unable to move from a current location, due to an obstruction, environmental conditions (e.g., heavy rainfall for a robot not protected from wet conditions), damage to a robot's track, leg, or other means of propulsion, a loss of connectivity to robotics management system 232 or other plant systems, etc. In addition, a robot working in extreme heat, such as in a desert environment, may overheat a component of the robot. Similarly, a robot working in extreme cold may affect the operation of a joint or other moving parts. Such temperature extremes may shorten the life of a robot's battery. Robotics management system 232 may monitor the robot's condition and maintain robot capability information 310 to reflect such changes and make decisions on how to schedule or re-schedule the fleet of robots for the best performance. In some embodiments, an operator or technician may be responsible for updating robot capability information 310 for robotics management system 232.

Each robot may also (or alternatively) report capability information, including payload status, to the robotics management system 232 prior to mission execution. If the robotics management system 232 determines that the payload capabilities of a robot are insufficient for a mission, robotics management system 232 may select a different robot for the mission and update the specific robot capabilities. Robotics management system 232 may check future scheduled missions against updated robot capabilities. If no other capable robot is available at the time a mission is to be run, then a robot payload may be changed, replaced, and/or updated to allow for the mission to run. Such a change, replacement, or update may impact the availability of the robot during a time in which the mission was initially intended or scheduled to be run. The mission may indicate a period of time, or other recurring circumstances in which a mission may be performed. In such a case, the mission may be rescheduled to run at a later time under conditions suitable for the mission. To avoid rescheduling, robotics management system 232 may verify robot status in advance of the start of the mission (the time needed will be dependent on the facility and personnel). This verification may require a pre-check, which may also include checks of camera, microphone, sensor, payload, and/or other capabilities of the robot. This may be done for all robots, including those with mutable and immutable sensors.

During robot definition management 350, robotics management system 232 may maintain robot definition information and may transmit robot-specific production rules 365 to robots 110. For example, in addition to the temporary changes in robot capabilities discussed above, a particular robot may be subject to permanent changes in capabilities and availability, such as the removal or installation of sensors or tools, or the relocation of the robot another area of a facility such that the robot is available to perform missions or tasks in a different limited portion of the facility. Modifications to a robot may change other capabilities of the robot, such as, for example, changes to the total weight of the robot may cause changes to battery life, movement speed, or maximum distance for the robot to travel. Such changes may be reflected in updated robot definition information. During detailed robot scheduling 325, robotics management system 232 may determine and update information about an overall robot schedule. During robot dispatching 345, robotics management system 232 may release selected robots 110 to perform robot-assigned tasks. During robot execution management 360, robotics management system 232 may transmit robot commands 370 to robot 110 and may receive responses 375 from robot 110. During robot tracking 335, robotics management system 232 may maintain information about robot location, status, and performance during robot-assigned activities or during idle periods. During robot data collection 355, robotics management system 232 may receive robot-specific data 380 from robot 110.

During robot performance analysis 340, robotics management system 232 may perform analysis of robot performance in the completion of robot-assigned tasks. This analysis may include updates to information for robot definition 305 and robot capability 310 to improve the performance of robot-assigned tasks. For example, the time taken for a robot to complete a mission or task, or a portion of a mission or task, such as traveling from one place to another, traveling stairs or a ramp, may be measured. In addition, the accuracy of measurements and data (e.g., photographs, or other data) gathered by the robot may be monitored to determine if the robot generally returns accurate measurements and data. Such information may be taken into account when planning a mission or task for the robot in the future or may be used to determine that the robot is in need of maintenance. In addition, a task assigned to a robot may be modified after scheduling, during execution, or as a result of execution. Circumstances around the mission may change, necessitating such a modification. For example, as a result of opening a door, a change in temperature or air composition may be detected, such that a different sensor is needed to provide accurate and actionable feedback regarding the environment around the mission. As another example, a measured temperature may be lower than expected, such that opening a manual valve may require a higher torque than can be applied by the original robot assigned to the task.

Figure 4:
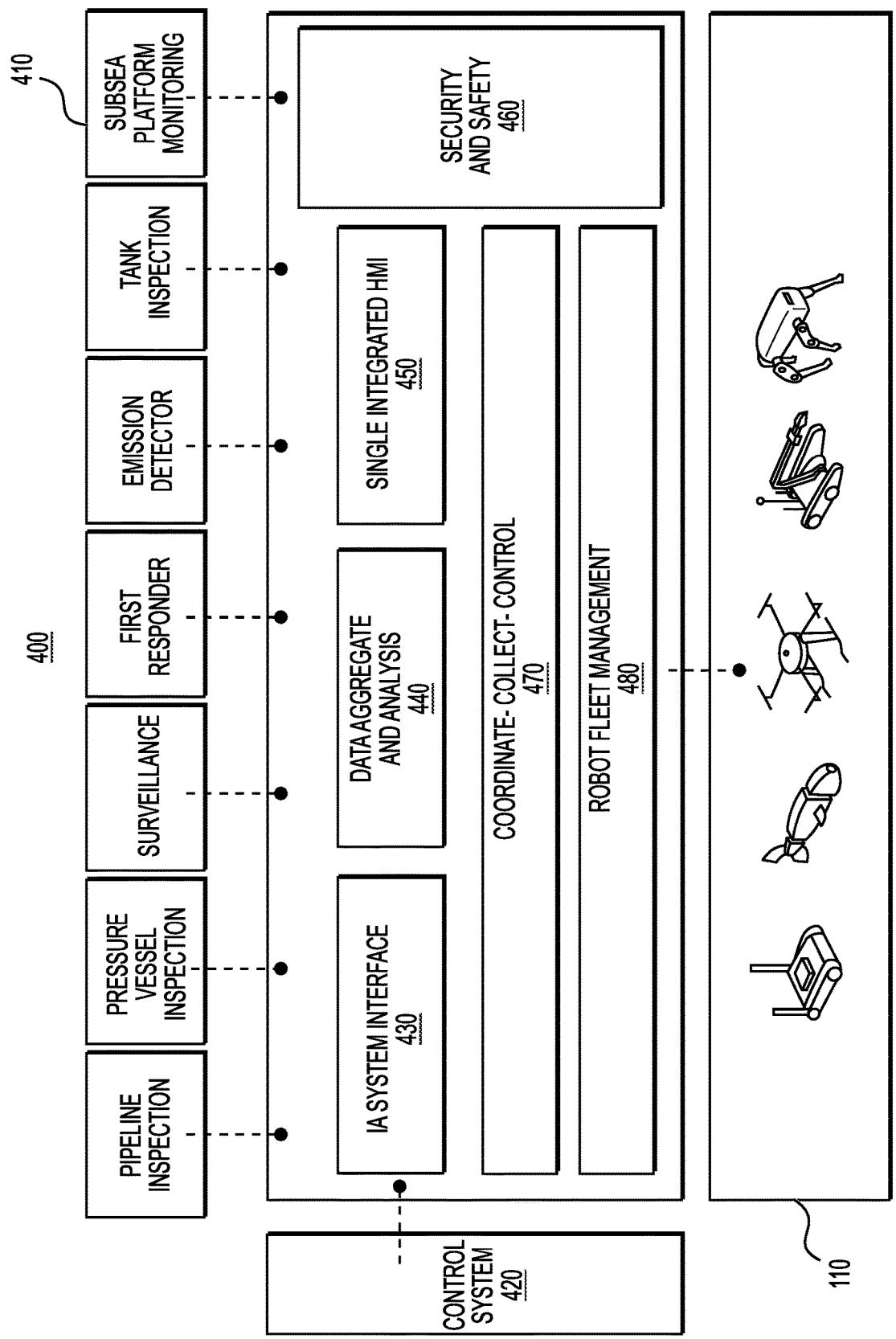
FIG. 4 depicts components of a robotics services platform within an operations management system, according to one or more embodiments.

As discussed above, an operations management system may interact with a robotics management system, such as a robotics services platform (RSP) to manage robots 110 and robot-assigned tasks. FIG. 4 depicts components of a robotics services platform (RSP) 400 within, or otherwise in communication with, an operations management system, according to one or more embodiments.

Activities of robots 110 within an operations management system 200 may relate to a variety of industrial operations 410 including, for example, pipeline inspection, pressure vessel inspection, surveillance, first responder, emission detection, tank inspection, and subsea platform monitoring. The identified operations 410 are only exemplary; the principles of this disclosure may pertain to any facility suitable for professional services to be carried out by a robotic fleet in dynamic environments. Such services may be repetitive and/or dangerous for human operators that may have previously placed human operators into such roles in reliance on human ability to recognize and adjust to the dynamic environment. Such dynamic environments may require the robotics services platform to recognize and adjust the activity of individual robots or the robot fleet to meet changing circumstances, or to operate in environments that may not be designed for robotic operations, while managing a fleet of robots of varying technical and operational capabilities. For example, applicable facilities may include chemical and pharmaceutical manufacturing, mining, food and beverage production, water and wastewater treatment, etc.

To support these operations, RSP 400 may receive commands from an external control system 420, such as operations management system 200 or an industrial automation (IA) system, and may, for example, include modules for interfacing with an industrial automation system 430, for data aggregation and analysis 440, for security and safety 460, for coordinating operations, collecting data, and controlling robots 470, and for robot fleet management 480. Access to these modules may be provided to a human operator by way of an integrated human-machine interface HMI, 450. Industrial automation system interface 430 may provide services for the automation of industrial processes, possibly in conjunction with an external industrial automation (IA) system.

Data aggregation and analysis module 440 may receive data from robot-assigned tasks, and may support the aggregation and analysis of the data. Security and safety module 460 may ensure the safety and security of facility operations and of individual robots 110. Coordinate-collect-control module 470 may provide overall management of robot-assigned activities, coordination or robot-assigned activities, and collection of data returned from robot-assigned activities. Robot fleet management module 480 may provide management of a fleet of robots 110, including, for example, maintaining information about the current status, location, availability, and performance of individual robots 110, coordinating related or potentially conflicting activities of multiple robots 110, and coordinating required maintenance and/or removal of individual robots 110.

Figure 5:
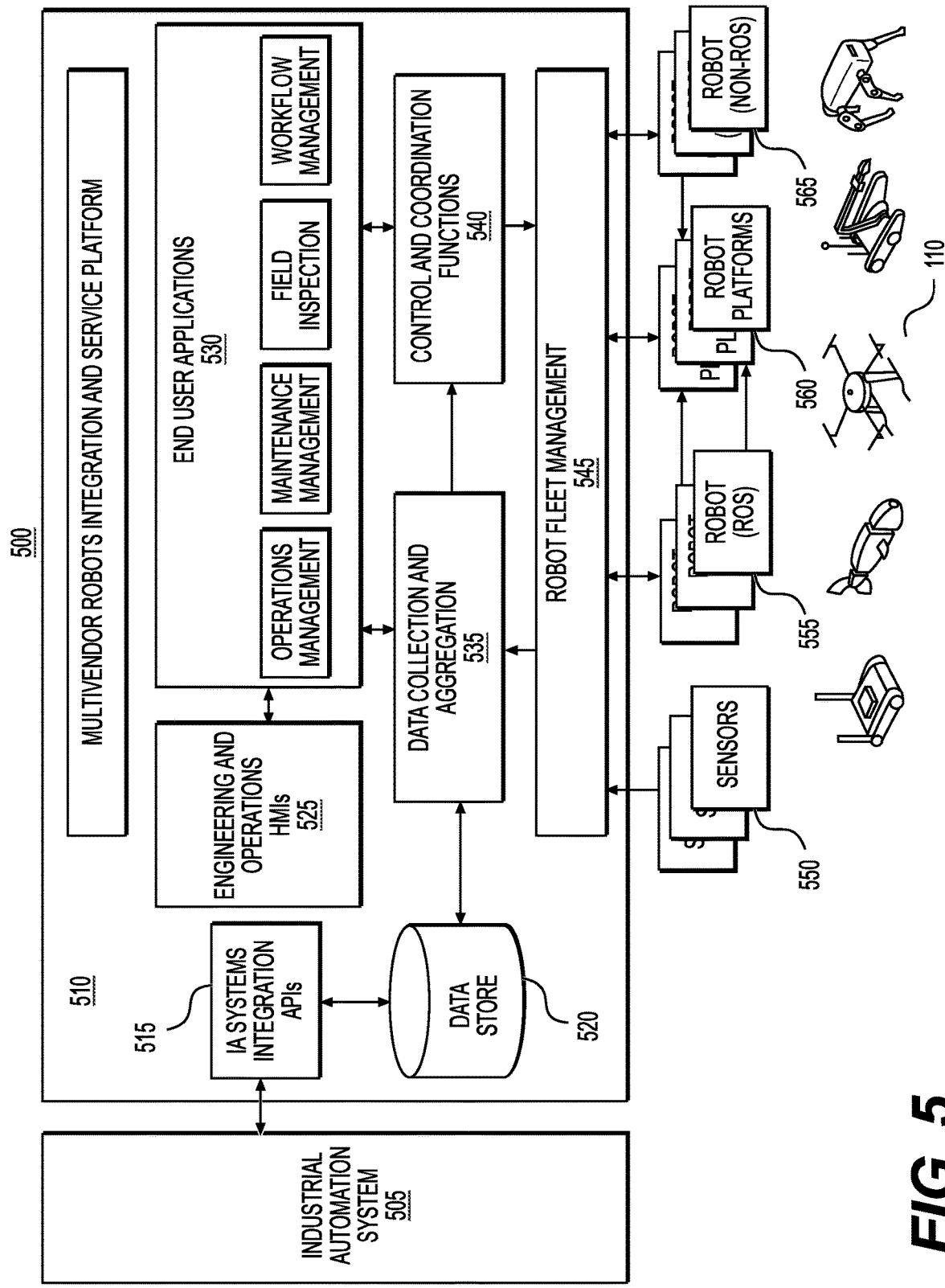
FIG. 5 depicts a detailed architecture of a multivendor robotic services platform, according to one or more embodiments.

Managing robot activities in a large or complex industrial facility may require coordination of robots provided by multiple vendors, each having different, and potentially incompatible, command and control or data management and communication protocols. Accordingly, integrating robot fleets into industrial facilities may become increasing complex as the number of robots and robot-assigned tasks increase. FIG. 5 depicts a detailed architecture 500 of a multivendor robotic services platform 510 to address these issues, according to one or more embodiments.

Multivendor robotic services platform 510 may interface with an external control system, such as operations management (OM) system 200 or industrial automation (IA) system 505, by way of IA systems integration application programming interfaces (APIs) 515. Multivendor robotic services platform 510 may provide humans that manage, control, or otherwise oversee the robot fleet, with access to end user applications 530, such as, for example, operations management relating to the overall operation of the facility, maintenance management relating to activities for the maintenance of the facility, field inspection relating to the direct inspection of portions of the physical facility, and workflow management relating to coordinating multiple human and robot activities within the facility, by way of engineering and operations human-machine interfaces (HMIs) 525. An instruction for an activity from OM 200 may be a work instruction (WI) that may be directed for assignment to a human. Such an instruction may be in a human-readable format. Multivendor robotic services platform 510 may transform the WI to robot commands.

If there are multiple types of robots from multiple vendors, translations may be performed differently for each type robot, as discussed elsewhere in this disclosure. If the activity is performed by a human, WIs may be assigned to operators in the context of shift planning. If the activity is to be assigned to a robot, robotic services platform 510 may autonomously translate and assign the WI to one or more robots, as discussed elsewhere in this disclosure. In other embodiments, if an alarm generates a robot mission, such as from an external application, then actions may be taken to ensure that a capable robot is available. For example, if the alarm is a critical alarm, robotic services platform 510 may determine to abort a current mission and handle the critical alarm mission if no robot or human is available. Alternatively, the operator may manually take over a robot to tend to the alarm. External systems may send a request for the performance of a task, and the robotic services platform 510 may reply with robot availability or mission starting information. Human and robot tasks may each include capability requirements for a human or robot assigned to the task, such as a requirement of being capable of working at a specified height above the ground, or a capability of using a particular tool. In addition, tasks may have requirements related to the operation status of the facility, such as time of day restrictions, a requirement that the plant not be in operation while the task is performed, or changes in governmental or other regulations governing operation of the facility. Robotic services platform 510 may segregate requests received from OM system 200 or IA system 505 into those that may be robot compatible tasks that may be sent to relevant robots to execute and those that may be robot incompatible tasks that may be returned to OM system 200 or IA system 505 for assignment to a human.

Robot fleet management module 545 may interact with a variety of robot platforms 560 supporting interaction with robots 110, as well as sensors 550 (e.g., environmental sensors). Robot platforms 560 may include platforms for interacting with open source robot operating systems 555, such as Robot Operating System (ROS), as well as vendor-specific (non-open source) robots 565. Robot fleet management module 545 may also interact directly with ROS robots 555 and non-ROS robots 565 rather than via robot platforms 560. The interaction between robot fleet management module 545 and robots 110 may include, for example, robot commands for mission and task completion based on information from control and coordination functions 540. The interaction between robot fleet management module 545 and robots 110 may further include, for example, collection of data and other information from robots 110 and sensors 550, which may be provided to data collection and aggregation module 535 for further processing. Such processing may include storing the collected and processed data in data store 520 and/or providing the collected and processed data to end user applications 530. Data stored in data store 520 may further be provided to (IA) system 505 by way of IA systems integration APIs 515. Coordination functions 540 may translate end user application functions into robot system functions. For example, if the end user requests an inspection of a gauge, then coordination functions 540 may translate that request into a robot mission to take a picture of the gauge. For example, coordination functions 540 may determine a robot mission including detailed steps such as navigating from the robot's current location to the location of the gauge, taking an image of the gauge, and returning either the image of the gauge or an analysis of the gauge reading based on the image. Other requested tasks would translate to other appropriate operations. To support robots from multiple vendors, the gauge mission may be preconfigured to support multiple robots by the robot fleet management module 545. For example, detailed operations corresponding to robots from multiple vendors may be pre-determined and stores. This may allow robot missions based on recurring task requests to be dispatched quickly or to be scheduled on a recurring basis. Coordination functions 540 may further coordinate robot tasks with operations being performed by other human and robot operators, such as steps being taken by operators in a control room, automated steps in the IA platform, and field operations. Each of these components work in tight synchronization to ensure proper operation of the facility. In conventional facilities, much of this synchronization may be conducted verbally; in a facility applying a robotic fleet, coordination functions 540 may integrate robots and automated systems into this synchronization. In some circumstances, complete control over a robot at all times may not be possible, and a robot may be allowed to operate semi-autonomously to use any particular capabilities of the robot to complete a task. Where multiple robots are assigned missions, coordination functions 540 may assign some missions with an appropriate time delay to avoid conflicts among robots operating in the same area.

Figure 6:
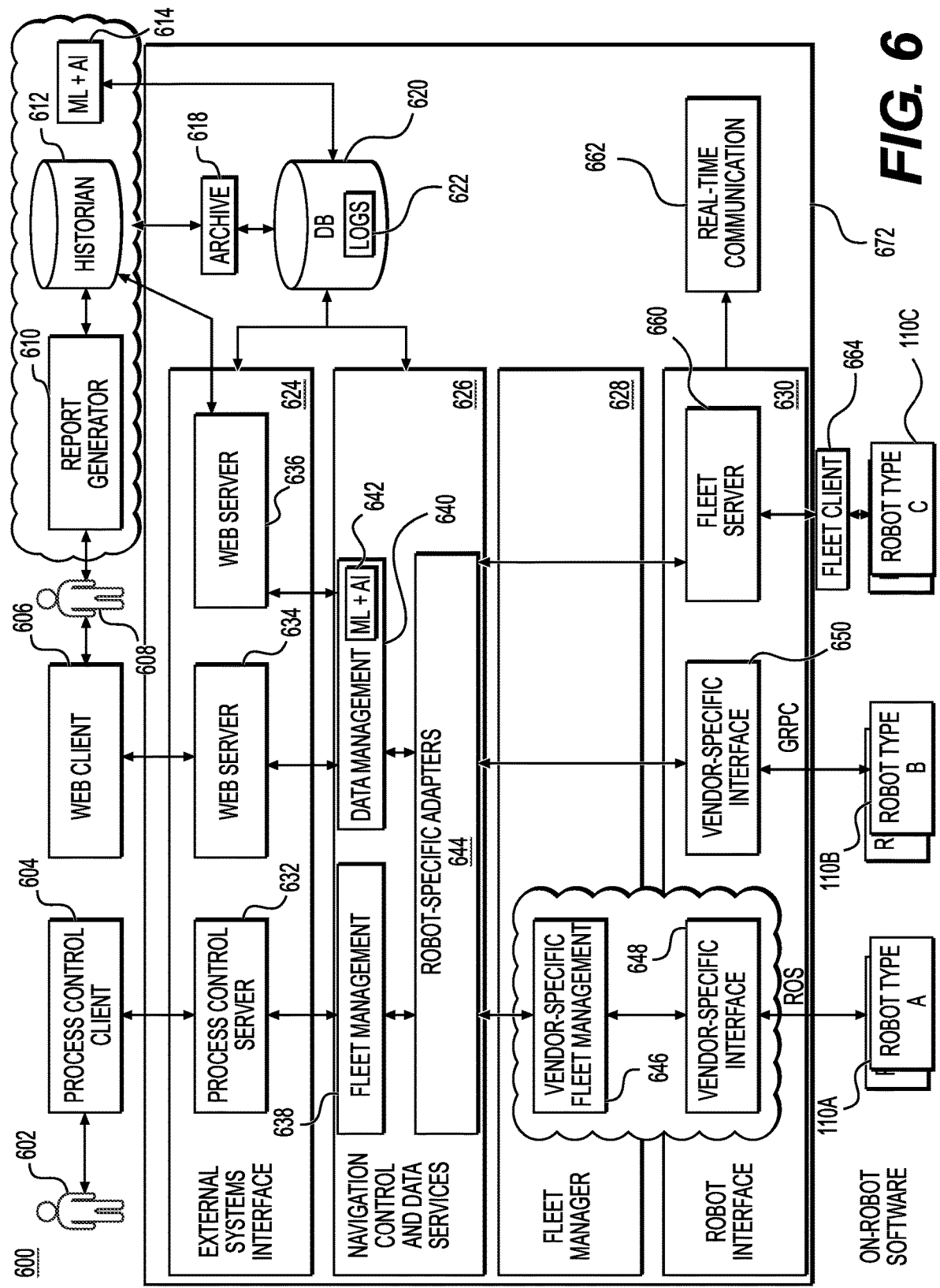
FIG. 6 further depicts a detailed architecture of a multivendor robotic services platform and associated components, according to one or more embodiments.

In a facility with robots from multiple vendors, robot fleet management, such as may be provided by robot fleet management module 545, robot activity control, such as may be provided by control and coordination functions 540, and data analysis, such as may be provided by data collection and aggregation module 535, may utilize additional vendor-specific and robot-type-specific capabilities in a multivendor robotic services platform (RSP). FIG. 6 further depicts a detailed architecture 600 of a multivendor robotic services platform (RSP), according to one or more embodiments.

Robot services platform 672 may include, for example, external systems interface 624, navigation control and data services 626, fleet manager 628, and robot interface 630, etc.

External systems interface 624 may include, for example, process control server 632, which may receive information for processes and tasks to be completed from a process control client 604 under the direction of a human operations manager or operator 602. For example, the received missions and tasks may include activities to be performed by humans or robots relating to the overall operation of the facility, such as facility inspections, data collection, facility control (e.g., changing control settings), etc. External systems interface 624 may further include, for example, a first web server 634, which may provide data reports to a web client 606 for display to a human operator or analyst 608. External systems interface 624 may further include, for example, a second web server 636, which may provide data feeds to a historian data store 612.

Historian data store 612 may provide data to a report generator 610, which may provide additional reports to human operator or analyst 608. Historian data store 612 may further provide data to an archive module 618 for storage in a database 620 within the robot services platform 672. Database 620 may provide data to a machine learning (ML) and artificial intelligence (AI) module 614 for further analysis. Analysis results from ML and AI module 614 may be stored in database 620. Database 620 may further provide data to historian data store 612 for access by report generator 610. Report generator 610, historian data store 612, and ML and AI module 614 may be cloud-based, or may otherwise operate separately from robot services platform 672.

Navigation control and data services 626 may include, for example, robot-specific adapters 644, which may provide platform-independent command, control, and data services for robots 110A, 110B, and 110C. Robot-specific adapters 644 may include adapters for communication of data collected by robots 110, such as, for example, photos, video, environmental data, sensor readings, etc., adapters for communication of data about robots 110, such as, for example, robot motion and location, robot health and status, robot capabilities, etc., and adapters for communication of command and control information to and from robots 110, such as, for example, multi-step mission instructions, individual operation instructions (e.g., navigate to a destination, take a photograph, take a video recording, take a sound recording, take an environmental measurement, take a temperature measurement of a substance, take a temperature measurement of the air, take a humidity measurement, determine an instrument reading, measure a presence or concentration of a gas or chemical, emit light of a particular wavelength, intensity, and/or emission pattern, emit sound of a particular pitch, intensity, and/or emission pattern, emit a radio frequency homing beacon, transmit stored data via a radio frequency or wireless data network, connect to a power source, connect to a radio frequency or wireless data network, connect to a data network port, modify a setting of a valve or other control, such as by adjusting the position of a valve, vane, locally controlled pump, or drive, take a manual product sample, press a button, change a switch position, move an object, stop all operations, return to home, activate a particular sensor, etc.), etc. Robot-specific adapters 644 may also receive information from robots 110 including, for example, information about task or mission status and completion, non-data task completion information (e.g., mission complete or abandoned, etc.).

Command/control and data information may be maintained generally within RSP 672 in one or more common internal formats. This may allow the internal operations of RSP 672, and the interfaces and information shared outside of RSP 672, such as with other components of an operations management system (OM), to be independent of which robots or robot types are active in the facility. Thus, the complexity of utilizing a diverse fleet of robots within a facility may be reduced. To this end, each adapter may take in information from RSP 672 in one or more of the common internal formats, transform that information into a specific information suitable for the particular robot to which it will be communicated, and then transmit the transformed information to the particular robot. For example, a definition of a robot task or mission may be transformed from a common internal format to a format that conforms to the expected command protocols for the assigned robot. Conversely, data transmitted from a robot may be received by an adapter in a robot-specific format and be transformed by an adapter into a common internal format for use by RSP 672 and other components of an operations management system (OM), such as operations management system (OM) 700 described in FIG. 7. A common internal format for a definition of a robot task or mission may include a list of measurements or data to be captured within a facility. Adapters 644 may transform this list into robot-specific instructions that may include, for example, directions to physically travel to the data-capture locations and which instruments to use. Vendor specific robot data may also be parsed by the adapters 644 to detect generalized or useful information to display to an operator. For example, data such as battery life may be displayed in different ways (percentage/voltage remaining/time remaining) that may be parsed and standardized.

Some such adapters 644 may be narrowly adapted to communicate with particular robots according to robot type or vendor, while others may be compatible with multiple robot types. Adapters 644 may be considered fleet-specific adapters compatible with multiple robots of a same type and make operating concurrently or in cooperation. Adapters 644 may be manually coded based on the common internal data formats and information about data and command protocols for specific vendors and robots. Alternatively, such adapters may be automatically generated based on algorithmic or artificial intelligence processes. Adapters may be configured to provide equivalent levels of basic control across multiple robot types. This may include, for example, the capability of movement to specific points, data captures, and robot metric reporting. Adapters may further include added functionality depending on the robot vendor specific software limitations on each robot type. For example, if a robot is unable to log its metric data, the adapter may log the robot's metric data to maintain compatibility with a standard adapter level for other components of the platform.

Common features from different robot types may be abstracted into a common internal data format, such as map data, simulation data on 3D models, etc. OM system 700 or IA system 505 may assign a work instruction (WI) checklist, which may be in a human readable format, such as a spreadsheet, etc., consisting of instructions to record information corresponding to various identifiers. RSP 672 may convert a WI checklist into detailed information, such as absolute or relative position and orientation information such as GPS coordinates, site specific visual, electronic or magnetic identifiers etc., for execution by robots. Unstructured data types recorded by robots, for example media formats such as image, sound or video, etc., may be further processed by RSP 672 using data processing applications into structured data types, such as text or numeric data compatible for storage and processing in OM system 700 or IA system 505.

Navigation control and data services 626 may further include, for example, fleet management module 638 to receive information for missions and tasks to be completed from process control server 632. Fleet management module 638 may determine which of robots 110A, 110B, and 110C should perform each task or mission, and may provide detailed information about robot tasks and missions to robot-specific adapters 644. Fleet management module 638 may also provide information about the progress or completion of missions and tasks to process control server 632. Navigation control and data services 626 may further include, for example, data management module 640, which may receive data from robots 110A, 110B, and 110C by way of robot-specific adapters 644. Data management module 640 may further include a machine learning (ML) and artificial intelligence (AI) module 642, which may further analyze data received from robots 110A, 110B, and 110C.

External systems interface 624 and navigation control and data services 626 may provide information about tasks dispatched to and performed by robots 110A, 110B, and 110C, task results returned by robots 110A, 110B, and 110C, and other information related to the management of robots 110A, 110B, and 110C, and missions performed by robots 110A, 110B, and 110C, to database 620. For example, a record of robot tasks and task results may be stored in logs 622 within database 620.

Fleet manager 628 may manage a fleet of robots 110A, 110B, and 110C with respect to, among other things, scheduling and dispatching missions and tasks to robots 110A, 110B, and 110C, monitoring the health and maintenance status of robots 110A, 110B, and 110C and their components, and scheduling maintenance of robots 110A, 110B, and 110C. Fleet manager 628 may include vendor specific fleet management module 646, which may provide management of robots 110A, 110B, and 110C that is specific to the vendor of one or more of robots 110A, 110B, and 110C. A separate vendor specific fleet management module 646 may be provided for each vendor-specific interface, such as vendor-specific interfaces 648 and 650. Fleet manager 628 may assign missions and tasks to robots 110 based on mission requirements and robot capabilities.

For instance, if fleet manager 628 determines that a mission can be supported by only a robot type of type A, fleet manager 628 may assign the mission to only a robot among robots 110A, 110B, and 110C of type A. For example, a mission may require traversing obstacles, such as stairs, that can only be traversed by robots of a particular type. For another mission that can be assigned to a robot of type A or B, fleet manager 628 may assign the mission to a robot among robots 110B, and 110C of type A or B based on the availability of each robot 110A, and 110C. The availability of each robot 110A, 110B, and 110C may be determined by fleet manager 628 using metrics such as, for example, communications state and battery life, etc. In some embodiments, operations management system 200 may specify a mission or task to be performed by a specific robot or a robot among a specific group of robots. If a group of robots is specified, then fleet manager 628 may assign the mission to a selected robot among the specified group of robots. In addition, some attributes of a robot type or robots from a particular vendor may have a known reliability and fleet manager 628 may apply more or less direct monitoring of a robot based on this known reliability.

Robot interface 630 may include, for example, a first vendor-specific robot interface 648, a second vendor-specific robot interface 650, and a fleet server 660. Each of first vendor-specific robot interface 648 and second vendor-specific robot interface 650 may provide an interface to a robot that is specific to the vendor of that robot. For example, first vendor-specific robot interface 648 may interact with robot 110A by way of a robot operating system (ROS) interface, while second vendor-specific robot interface 650 may interact with robot 110B by way of a proprietary remote procedure call (RPC) interface. The number and types of vendor-specific robot interfaces provided by robot interface 630 is not limited, and may depend of the number and type of robots in the fleet of robots managed by robot services platform 672. Vendor specific interfaces are conventionally required to access these robots. That is, robots from each vendor typically have proprietary software and are gated using each vendor's application programming interfaces (APIs). For example, if a vendor uses gRPC calls to access their unique API to control a robot from that vendor, there may be no other alternative to communicate with or control the robot.

Fleet server 660 may interact with a coordinated fleet of robots, such as robots 110C by way of fleet client 664. Robot interface 630 may further interact with real-time communication module 662 to provide additional communication streams to, for example, robots 110A, 110B, and 110C, human operations manager or operator 602, such as through process control server 632 or process control client 604, or other components of RSP 672. For real-time communication, robot interface 630 may support multiple types of protocols for streaming data. For example, WebRTC is a streaming protocol for high quality video/sound streaming that may be utilized for such communications. Such streaming may include, for example, receiving data to be displayed to an operator as well as performing real-time processing of the data using artificial intelligence (AI) or machine learning (ML) to support functions such as, for example, anomaly detection. Real time communication can be important for fleet management in order to execute different tasks. Some robots may have a capability to work during lost communication for a short period of time, while others may not. Fleet server 660 may need to frequently communicate with each robot based on the robot's capability and keep track of a robot during a mission.

Vendor-specific fleet manager module 646 and fleet server 660 may be cloud-based, or may otherwise operate separately from fleet manager 628 and robot interface 630.

Robots 110A, 110B, and 110C may be provided by different vendors and may be of multiple types, and may further have distinct instrumentation, tools, and sensors available. Each robot may maintain, possibly in conjunction with robot management and fleet management modules of RSP 672, information about the health and status of the robot 110, including battery or fuel levels, robot capability information 310, locations, malfunctions, and maintenance requirements, etc.

Examples of robots 110A, 110B, and 110C may include robots that are fully autonomous, pre-programmed for specific tasks, motions, routes, or activities, or under direct human control. Robots 110A, 110B, and 110C may be stationary or mobile, and mobile robots may include wheeled, tracked, bi-ped, quadruped, or multi-ped, or other means of propulsion. Robots 110A, 110B, and 110C may be provided with tools, sensors, or other hardware for the completion of missions and tasks, such as articulated arms, grips, claws, wrenches, drivers, hammers, pry bars, cameras, microphones, chemical detectors, noise sensors, vibration sensors, etc. Robots 110A, 110B, and 110C may include digital and physical storage, such as for photographs, video, sound, environmental readings, environmental samples, such as soil, chemicals, etc. Robots 110A, 110B, and 110C may include various communications capabilities, including analog (radio and video transmission, etc.) and digital (Wi-Fi, Bluetooth, other near-field communication, etc.).

Figure 7:
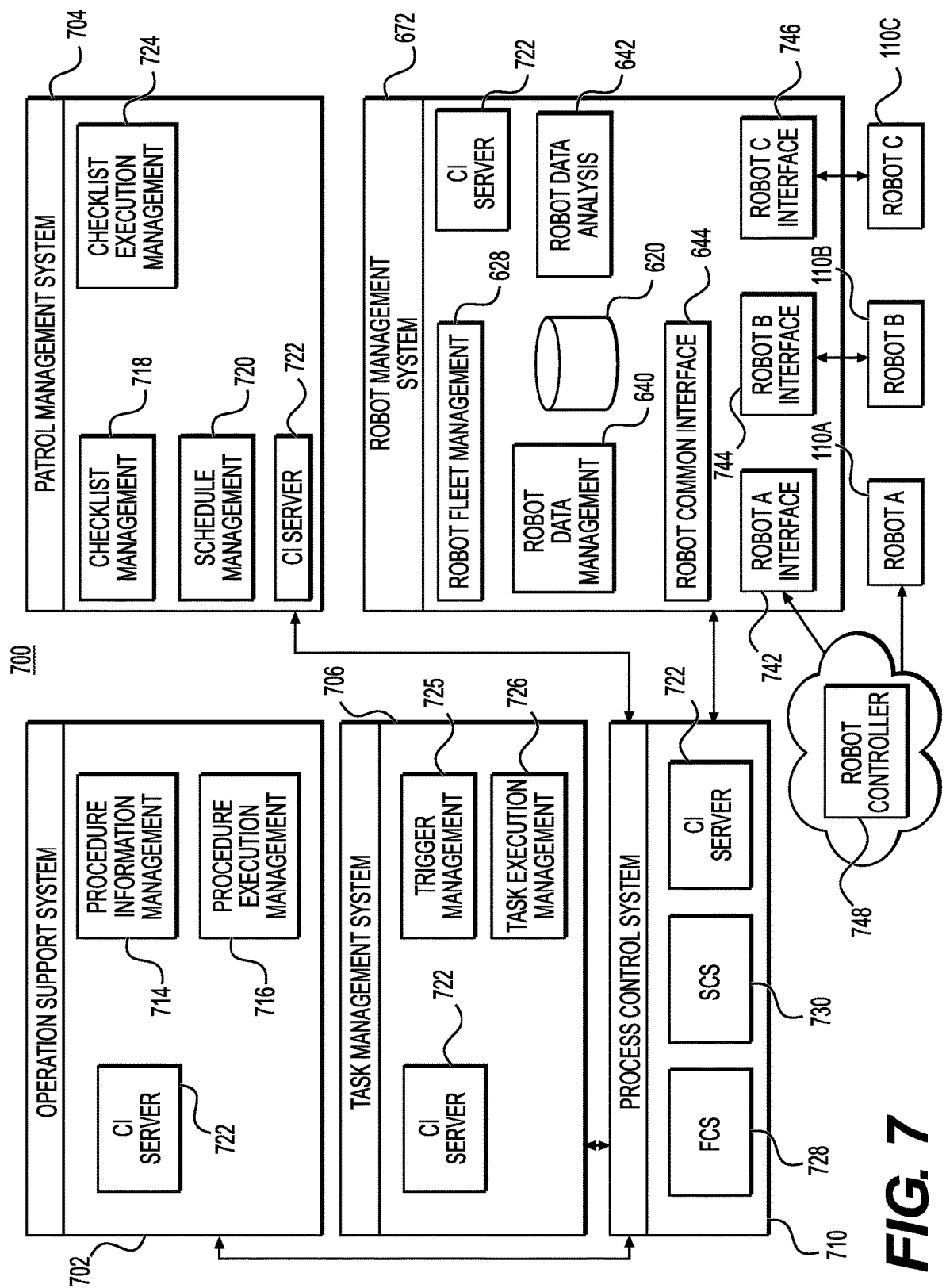
FIG. 7 depicts subsystems of an operations management system including a multivendor robotic services platform, according to one or more embodiments.

A robotic services platform, such as RSP 672, may interact with and depend upon other subsystems of an operations management system. FIG. 7 depicts subsystems of an operations management system 700 as well as a multivendor RSP, which may operate as part of or separate from, or otherwise in cooperation with, operations management system 700, according to one or more embodiments.

Operations management system 700 may include multiple subsystems to support the operation and management of an industrial facility. Such subsystems may include, for example, an operation support system 702, a patrol management system 704, a task management system 706, a process control system 710, and a robotics management system or robot support platform (RSP) 672.

Process control system 710 may provide operations control and monitoring for a facility through control subsystems that may be distributed throughout the facility or located outside the facility. Process control system 710 may include, for example, a collaborative information server 722, which may support sharing information between process control system 710 and other subsystems of operations management system 700. Process control system 710 may also include a field control system 728, which may control processes within the facility and collect data from those processes data via field instruments, and a safety control system 730, which may monitor safety conditions of processes within the facility and may ensure that processes return to a safe state if deviations occur. Process control system 710 may coordinate with operation support system 702, patrol management system 704, task management system 706, a and robotics management system or RSP 672.

Operation support system 702 may provide services to support the overall operation of the facility. Operation support system 702 may include, for example, a collaborative information server 722, which may support sharing information between operation support system 702 and other subsystems of operations management system 700, a procedure information management module 714, which may store and manage information about procedures and processes for operating the industrial facility, and a procedure execution management module 716, which may manage execution of the procedures and processes.

Patrol management system 704 may provide services related to periodic patrol and monitoring of the facility with respect to operations, safety, and security. Patrol management system 704 may include, for example, a collaborative information server 722, which may support sharing information between patrol management system 704 and other subsystems of operations management system 700. Patrol management system 704 also may include a checklist management module 718, which may manage checklists to ensure that all operations, safety, and security protocols are sufficiently covered, a checklist execution management module 724, which may manage the execution of tasks to fulfill checklist requirements, such as may be determined by checklist management module 718, and a schedule management module 720, which may schedule the completion of checklist tasks. Checklists and associated checklist tasks may be assigned to either human or robot assets.

Task management system 706 may provide the creation, assignment, and monitoring of tasks within a facility. Tasks may be human-assigned or robot-assigned. Task management system 706 may include, for example, a collaborative information server 722, which may support sharing information between operation task management system 706 and other subsystems of operations management system 700. Task management system 706 may also include a trigger management module 725, which may generate new tasks triggered by incoming information, and a task execution management module 726, which may control the assignment and execution of tasks.

RSP 672 may provide management and operation of a fleet of robots of varying types provided by multiple vendors. RSP 672 may include, for example, a collaborative information server 722, which may support sharing information between RSP 672 and other subsystems of operations management system 700. RSP 672 may also include robot fleet management module 628, robot data management module 640, robot common interface module such as robot-specific adapters 644, database 620, a robot data analysis module such as data management module 640 and machine learning (ML) and artificial intelligence (AI) module 642, all of which are discussed above with respect to FIG. 6. RSP 672 may further include, for example, robot interface modules specific to different types of robots, such as robot A interface 742 interacting with robot 110A of type A, robot B interface 744 interacting with robot 110B of type B, and robot C interface 746 interacting with robot 110C of type C. Robot interfaces may connect directly with robots 110, such as is shown for robot B interface 744 and robot C interface 746, or may connect to a robot 110 through an external robot controller, such as robot control 748 connecting robot A interface 742 with robot 110A. Such external robot controllers may be cloud-based servers or may be connected by various types of computer networks.

As noted previously, managing fleets of robots to perform operations represents only part of the challenge. Another challenge is maintaining the fleet of robots as effectively and efficiently as possible so that the robots are in working order to perform production missions, with minimal disruption and expenditure of resources. Accordingly, various techniques are described herein for managing a fleet of mobile robots during times in which those robots are not performing production missions in the field 236, e.g., while they are located in a robot staging area (or "robot yard") in which the mobile robots can be managed, serviced, charged, and/or stored.

Figure 8:
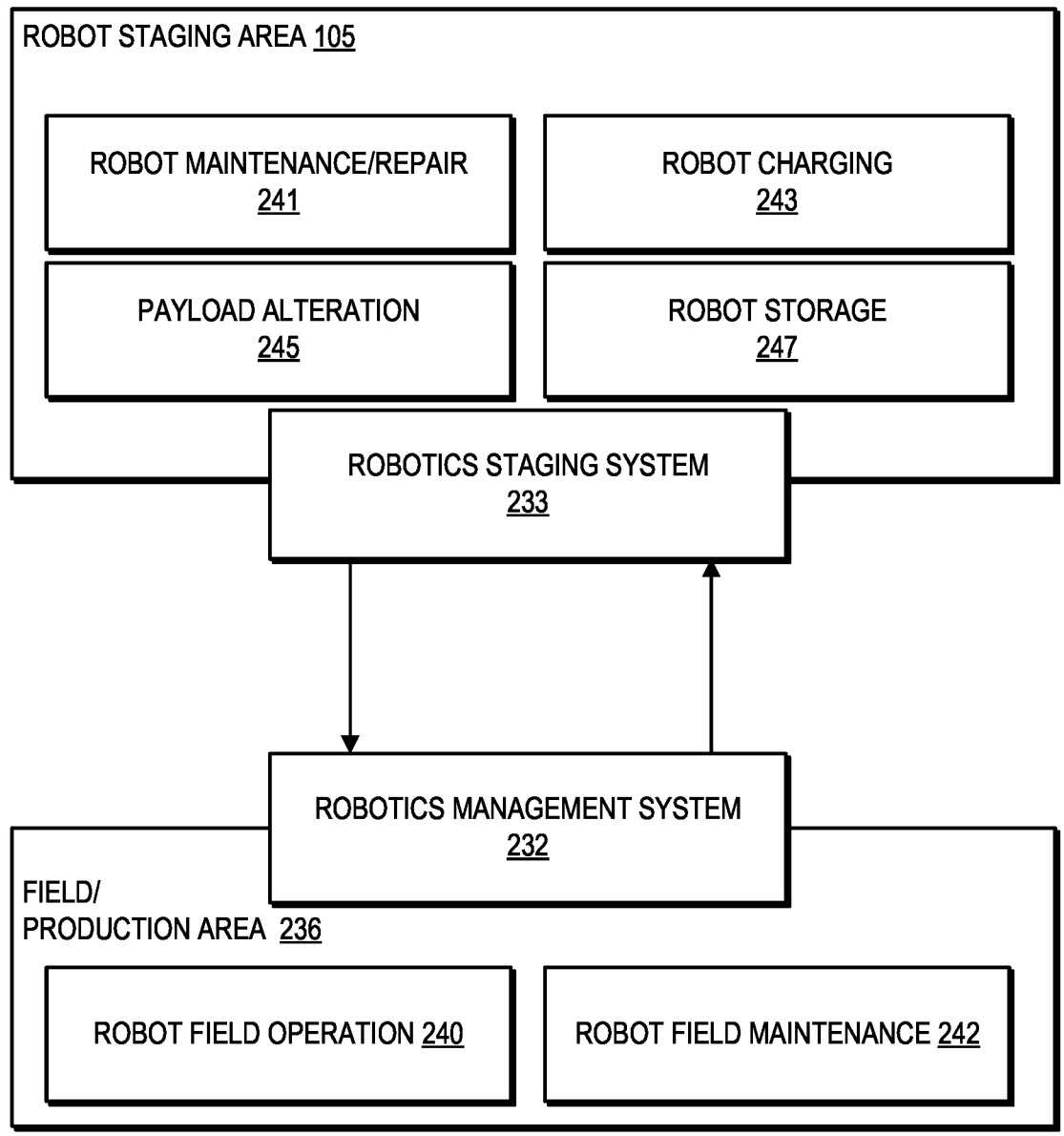
FIG. 8 depicts an example of how a robotics management system and a robotics staging system may cooperate to orchestrate robots in both a production area and a robot staging area.

FIG. 8 schematically depicts an example of how robotics management system 232 (which may also share characteristics with robot services platforms mentioned elsewhere here, e.g., as indicated at 400, 672, etc.) may hand over control of mobile robots to a robotics staging system 233, so that robotics staging system 233 can orchestrate mobile robots within a robot staging area 105. While a single robot staging area 105 is depicted in the figures, this is not intended to be limiting; there may be any number of distinct staging areas, each with one or more robot staging stations. In various implementations, robotics staging system 233 may be implemented using one or more computing systems, such as by one or more servers of a cloud infrastructure, or one or more servers that are local to the industrial facility.

As described previously in reference to FIG. 2, robotics management system 232 may manage robots to perform tasks managed by office/CCR 234 (not depicted in FIG. 8, see FIG. 2) in production area/field 236. Production area/field 236 is where operational components of the industrial facility are deployed and operated to perform various industrial processes, which may include, but are not limited to, petrochemical refining, chemical processing, food and beverage, consumer package goods, pharmaceuticals and biopharmaceuticals, etc. Robot staging area 105, by contrast, includes one or more areas (e.g., rooms, spaces, sections, etc.) of the industrial facility 120 that are designated for use in staging robots.

As part of the handover from robotics management system 232 to robotics staging system 233, robotics management system 232 may provide a variety of different information to robotics staging system 233. This information may include, but is not limited to, states of robots returning to robot staging area 105 after performing tasks such as field operations 240 and/or field maintenance 242 in field 236 (e.g., the production area of the industrial facility), status of tasks assigned to robots, quality of completed tasks (e.g., whether completed tasks were performed within expected operational performance metrics, such as speed, efficiency, quality, re-tries, etc.), tasks to be performed by robots when available, a schedule of tasks to be performed, characteristics of the environment in which the robots have been operating (e.g., temperature, humidity, or the presence of dust, dirt, mud, sand, ice and the like), etc.

States of the robots can be determined, for instance, by robotics management system 232 and/or by robotics staging system 233 and may include data like robot health data (which may indicate whether the robot needs maintenance/repair), battery levels, location, robot definition 305, robot capability 310, robot schedule 315, robot performance 320, outstanding/available mission that the mobile is eligible to perform, etc. Robotics staging system 233 may use this information to identify actions that need to be performed to prepare mobile robots to be ready to perform subsequent missions. More generally, robotics staging system 233 may use this information to orchestrate the actions of robots entering into, already within, or ready to depart robot staging area 105. For example, robotics staging system 233 may orchestrate the actions of robots transitioning from production modes, in which the robots execute missions/tasks in production area 236, to staging modes in which they perform staging missions in robot staging area 105.

Various robot staging tasks may be performed, e.g., robotics staging system 233, by robots themselves, and/or by human personnel, within robot staging area 105. In FIG. 8, for instance, these tasks include robot maintenance/repair 241, robot charging 243, payload alteration (including tooling and retooling) 245, and robot storage 247. As will be described in more detail in reference to subsequent figures, robot staging area 103 may be divided into and/or include a plurality of robot staging stations, each station being usable for one or more of the robot staging tasks 241, 243, 245, 247 depicted in FIG. 8.

Robot maintenance/repair tasks 241 may include any task involved with keeping robots in operational condition so that they can perform various operational tasks 240, 244 in field 236. These may include, for instance, applying lubricants such as oil to various joints/gears/actuators, maintaining robot tools (e.g., sharpening blades), replacing damaged robot components, etc. Robot charging tasks 243 include tasks involved with charging robots' batteries, such as having the robots engage with chargers deployed at charging robot staging stations. These chargers may be wired and/or wireless.

Payload alteration tasks 245 may be similar to robot maintenance/repair tasks 241, except that payload alteration tasks may relate to configuring or reconfiguring a robot for performance of new tasks, as opposed to repair or routine, mission-agnostic maintenance. For example, robots may be configured with modular payloads that include various tools and/or sensors. Affixing these payloads to robots may enable those robots to perform operations tasks 240, 242 they were unable, or at least less well-suited, to perform previously. Robot storage tasks 247 include tasks for relocating robots to short-term and/or long-term storage locations at which those robots are out of the way of other robots and/or other types of robot staging stations, such as charging stations or maintenance/repair stations.

Figure 9:
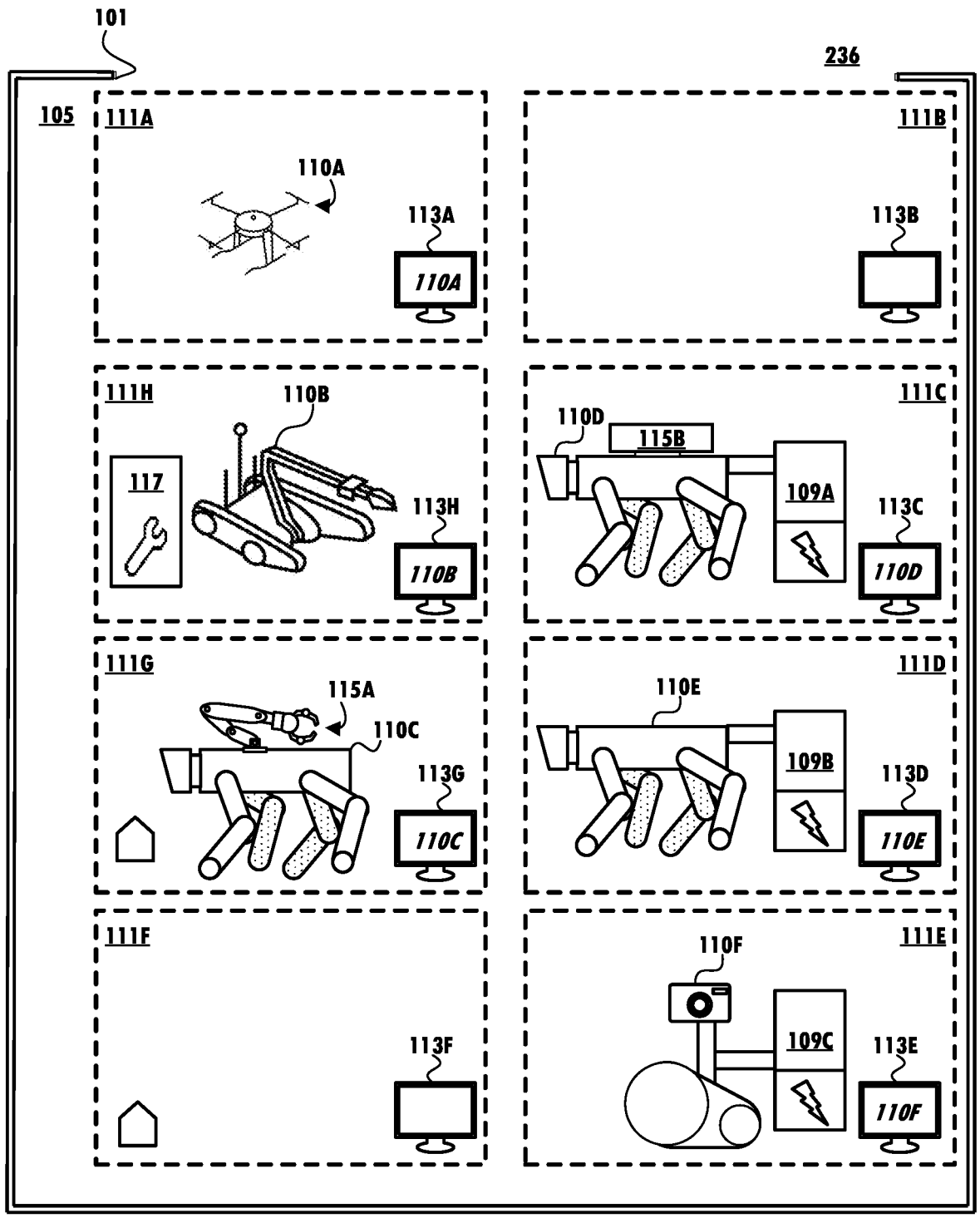
FIG. 9, FIG. 10, FIG. 11, FIG. 12, FIG. 13, FIG. 14, and FIG. 15 schematically depict an example sequence demonstrating how various mobile robots may be operated within a robot staging area, in accordance with various implementations described herein.

FIG. 9 depicts an example industrial facility that includes the production area 236 (also referred to previously as a "field") and robot staging area 105. In some implementations, including that depicted in FIG. 9, robot staging area 105 is separate or distinct from production area 236, and production area 236 is accessible from robot staging area 105 via one or more transitional areas 101. In FIG. 9, for instance, the transitional area 101 takes the form of an opening in a wall or barrier that allows robots to pass between production area 236 and robot staging area 105. It is not required that robot staging area 105 be physically separated from production area 236. However, in some implementations, robot staging area 105 may be separate from production area 236 because having robots stored, charging, being maintained, or being retooled in an area in which they could potentially obstruct or collide with other mobile robots performing production missions may be detrimental to the robots and/or to the industrial facility's operations.

Robot staging area 105 includes a plurality of robot staging stations 111A-H, which may take various forms. For instance, robot staging stations 111C-E take the form of charging stations that include chargers 109A-C. Robot staging station 111H takes the form of a maintenance and/or payload alteration station that includes various equipment 117 (tools, replacement parts, modular payloads, etc.) for repairing, maintaining, and/or reconfiguring robots. Robot staging stations 111G and 111F take the form of robot storage stations in which mobile robots can be stored for various time intervals while they are not needed. While the various types of robot staging stations are depicted separately in FIG. 9, this is not intended to be limiting. A robot staging station can serve more than one purpose. For example, either of robot staging stations 111C-E may, in addition to being charging stations, also serve as storage stations, especially robot staging station 111E, which is near the back of robot staging area 105 and therefore out-of-the-way of other mobile robots.

Several mobile robots 110A-F are depicted in FIG. 9. First mobile robot 110A takes the form of a UAV. Such a mobile robot 110A may be equipped with various types of sensors, including vision sensors (e.g., RGB, infrared, stereoscopic) and other types of sensors, that enable mobile robot 110A to quickly and unobtrusively (due to its being airborne) inspect a variety of aspects of production area 236.

Second mobile robot 110B takes the form of a wheeled robot with an onboard robot arm that can be operated to perform various tasks, such as adjusting, replacing, and/or repairing equipment such as actuators and/or sensors that are deployed in production area 236. Second mobile robot 110B is currently at maintenance robot staging station 111H in FIG. 9, e.g., to be repaired and/or reconfigured to perform a particular task.

Third mobile robot 110C, fourth mobile robot 110D, and fifth mobile robot 110E take the form of multi-pedal robots—quadruped in this example. Third mobile robot 110C is currently (i.e. in FIG. 9) at storage robot staging station 111G. Fourth mobile robot 110D and fifth mobile robot 110E are currently at charging robot staging stations 111C and 111D, respectively.

Each of these mobile robots 110C-E, as well as other types of mobile robots described herein, may be capable of receiving modular payloads (generally referenced at 115) that include, for instance, different types of sensor packages, actuators, etc. For example, third mobile robot 110C is equipped with a robot arm 115A. Fourth mobile robot 110D is equipped with an advanced sensor package 115B that may include sensor(s) that are not otherwise natively integrated with fourth mobile robot 110D. Fifth mobile robot 110E is not equipped with a payload, but as will be shown in subsequent figures, can be moved to maintenance robot staging station 111H to be equipped with a payload. A sixth mobile robot 110F takes the form of a wheeled robot that includes a vision sensor, but does not currently include any actuators or payloads. Sixth mobile robot 110F is currently being charged at charging robot staging station 111E.

Mobile robots 110A-F may be moved about robot staging area 105 in various ways to facilitate repair, charging, maintenance, storage, and/or storage of the mobile robots, as well as achieve efficient positioning of mobile robots 110A-F to minimize the likelihood of collision and/or to ensure each mobile robot 110 is unencumbered from performing production missions as they arise. For example, mobile robots 110A-F may be repositioned to storage robot staging stations 111G-F and/or other robot staging stations while they are not in use, so that busier robots are able to perform their tasks.

In some implementations, mobile robots 110A-F may be configured to localize themselves using various techniques, such as using Global Positioning System (GPS) sensors, wireless triangulation, inertial measurement units (IMUs), or other types of localization. For example, robots 110A-F may be configured with maps of production area 236 and/or staging area 105, including locations of the various robot staging stations 111A-H. However, some of these localization techniques may not be as effective in industrial plants. Some industrial plants include indoor areas, in which GPS may not be as effective. Moreover, GPS in general may not be as accurate as required to enable the mobile robots 110A-F to be positioned in precise locations.

To facilitate relocation of mobile robots 110A-F into appropriate robot staging stations in robot staging area 105, in some implementations, each robot staging station 111 may be equipped with an output device 113 to render fiducial output. Mobile robots 110A-F in turn may be equipped with sensors that are configured to detect this rendered fiducial output. Thus, the output devices 113A-H may be operated to effectively summon mobile robots 110A-F to desired robot staging stations 111. For example, robotics staging system 233 may first cause an output device 113 at a selected robot staging station 111 to render fiducial output. Then, the robotics staging system may assign a mobile robot 110 a staging mission. The staging mission may cause the mobile robot to scan the plurality of robot staging stations 111A-H within robot staging area 105 to detect the rendered fiducial output, and travel to the robot staging station 111 at which the rendered fiducial output is detected.

Output devices 113A-H may take various forms. In FIGS. 8-14, output devices 113A-H take the form of display devices that can be operated to render visual output, including fiducial output. In other implementations, other types of output devices may be deployed. For example, robot staging stations 111A-H may be equipped with speakers to emit audible or inaudible beacons that are detected by pressure wave sensors (e.g., microphones) of mobile robots 110A-F. In other implementations, output devices 113A-H may take other forms, such as an infrared beacon that is detected by mobile robots 110A-F. Such infrared beacons may be modulated in various ways to identify which mobile robot 110 is supposed to travel to which robot staging station 111.

In some implementations in which output devices 113A-H take the form of display devices, each output device 113 may render a visual fiducial marker that identifies the particular mobile robot 110 that is supposed to occupy that robot staging station. These visual fiducial markers may take various forms, such as Quick Review (QR) codes, other types of barcodes, computer-readable text such as Magnetic Ink Character Recognition (MICR) text, other types of text that is readable by computing devices (e.g., mobile robots 110A-F), and so forth.

In some implementations, each mobile robot 110 may be assigned a unique fiducial marker (unique within the fleet or globally unique). To cause that mobile robot 110 to travel to a desired robot staging station 111, the robotics staging system may simply cause the output device 113 located at the desired robot staging station 111 to emit the unique fiducial marker assigned to the mobile robot 110. The mobile robot 110 may then scan robot staging area 105 for the rendered fiducial marker, and travelling to the robot staging station 111 at which the rendered fiducial marker is detected. In other implementations, fiducial markings may be assigned to robot missions, rather than individual mobile robots. Thus, assigning a particular robot mission with a particular fiducial output to a mobile robot may trigger that mobile robot to travel to the robot staging station at which the particular fiducial output is rendered.

Allowing mobile robots 110A-F to have discretion of movement outside of which robot staging station to which they are to travel can be advantageous. Rather than having to micro-manage mobile robots 110A-F—e.g., configuring them with comprehensive maps of the staging area—the mobile robots 110 themselves can handle decisions relating to obstacle avoidance, collision avoidance, efficient trajectory planning, etc. Many vendors already design their robots to perform collision avoidance and path planning natively; leveraging these native capabilities simplifies the design and operation of robotics staging system 233.

In FIG. 9, each mobile robot 110 is positioned at a robot staging station 111 at which the mobile robot's respective fiducial marker is currently displayed. For simplicity, in FIGS. 9-15 these fiducial markers take the form of the reference numbers of the respective mobile robots, in italicized text. However, as noted previously these fiducial markers may be rendered in a form that is easier for mobile robots to "read," such as QR codes. For instance, first output device 113A currently displays "110A", and as a result, first mobile robot 110A is currently positioned in first robot staging station 111A. Second output device 113B currently displays nothing, and no mobile robot is stationed at second robot staging station 110B. Third output device 113C currently displays "110D", and as a result, fourth mobile robot 110D is currently positioned in third robot staging station 111C. And so on.

Figure 10:
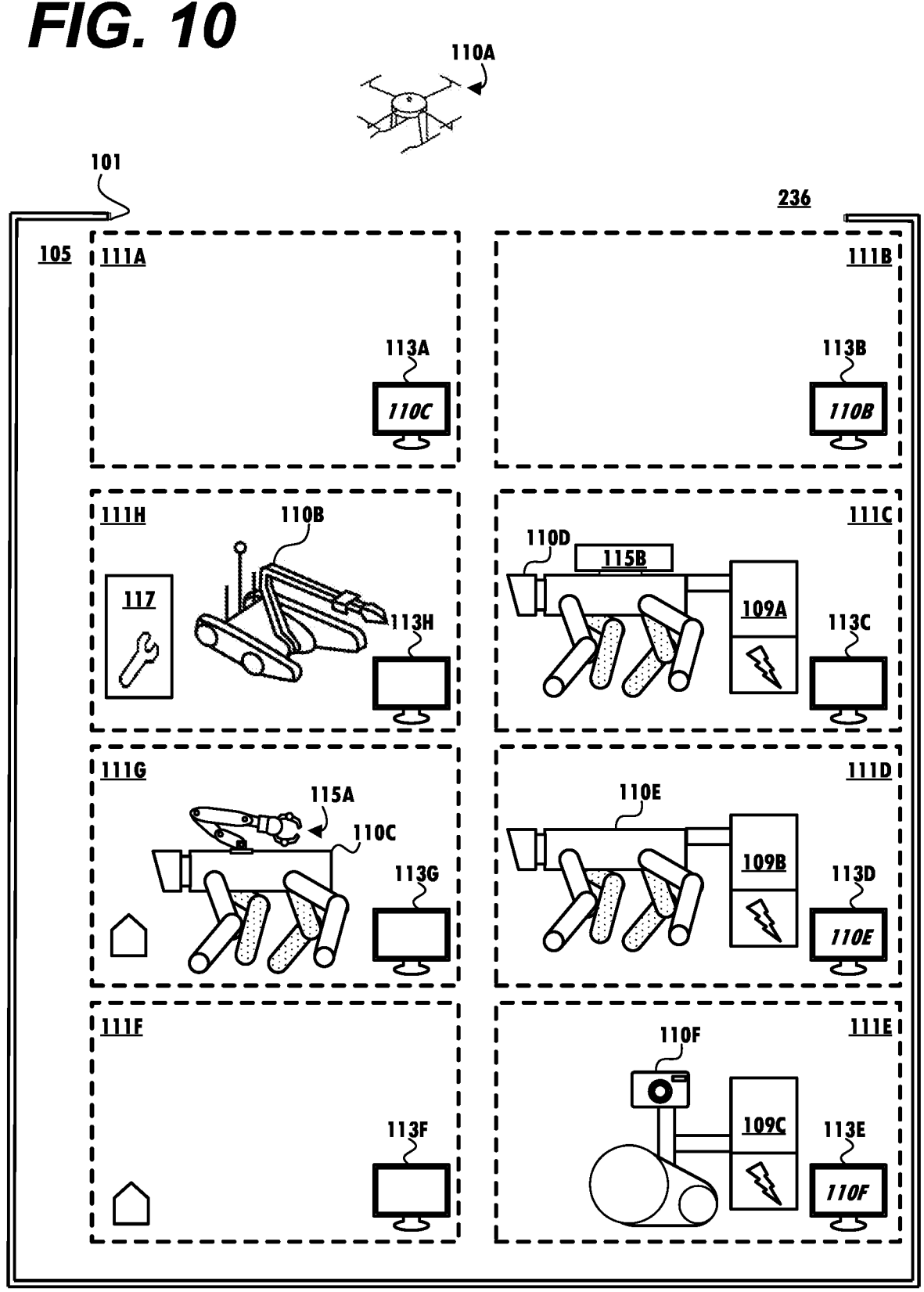

In FIG. 10, the output devices 113A-H are operated to render different fiducial markings than in FIG. 9. This may cause or enable at least some of mobile robots 110A-F to reposition themselves within robot staging area 105. For instance, first mobile robot 110A has travelled to production area 236, e.g., to inspect one or more sensors, gauges, actuators, or other attributes of the industrial facility. It may be assumed that various observations made by first mobile robot 110A (e.g., detection of an anomaly) may trigger responsive action by one or more of the remaining mobile robots 110B-F. Additionally or alternatively, responsive action by one or more of the mobile robots may be triggered by other events at the facility, such as the schedule of various robot task(s), or other asset operations, or by output from sensor systems not associated with a mobile robot.

For example, first output device 113A in first robot staging station 111A now displays "110C." This may cause third mobile robot 110C to travel to first robot staging station 110A so that it is well-positioned (e.g., unobstructed) to travel into production area 236, should first mobile robot 110A detect an anomaly. Second output device 113B in second robot staging station 111B now displays "110B." This may cause second mobile robot 110B to travel to second robot staging station 111B so that it also is well-positioned to perform a mission in production area 236, if called for.

Figure 11:
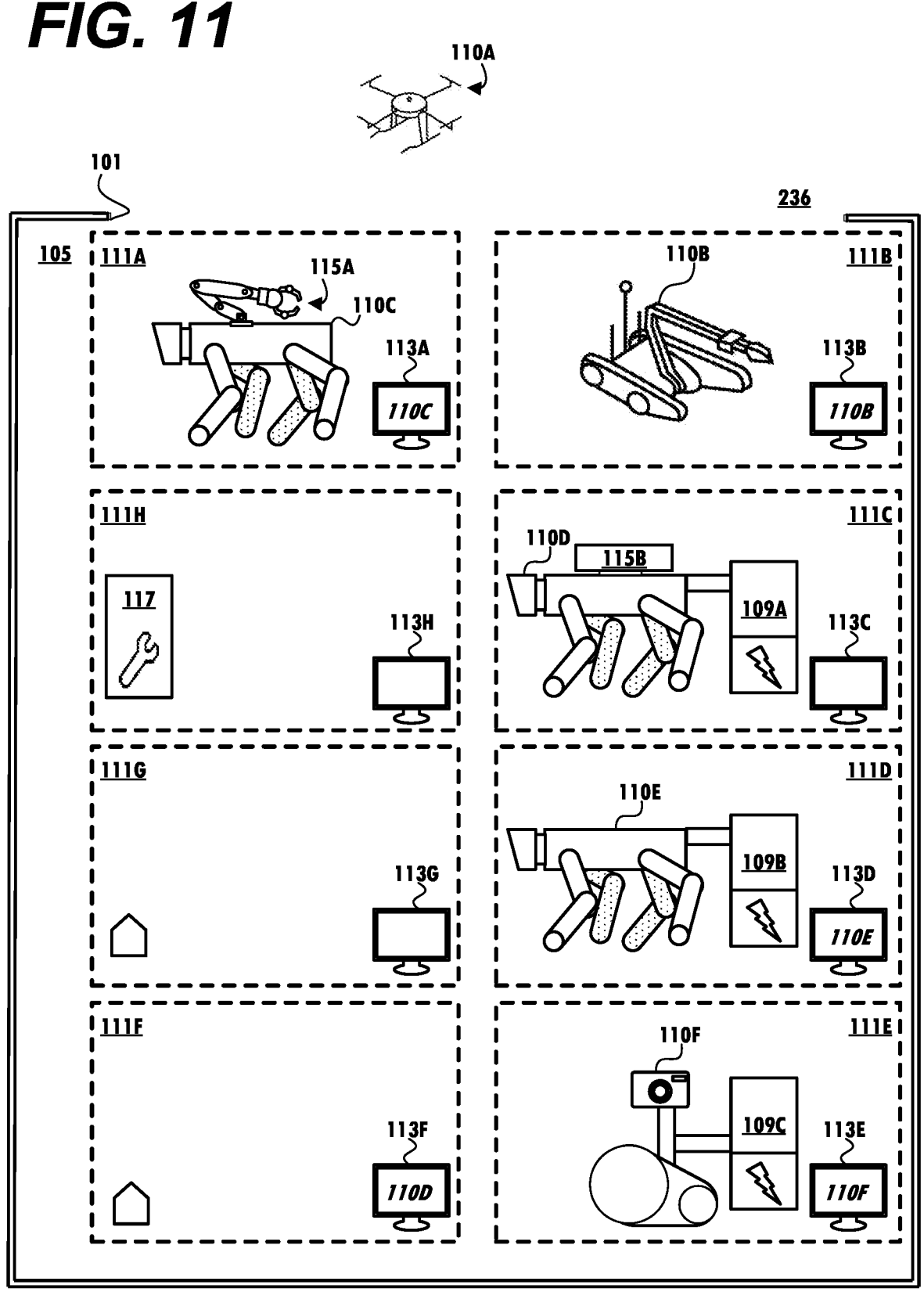

The results of the rendered fiducial markings in FIG. 10 are depicted in FIG. 11, where third mobile robot 110C has repositioned to first robot staging station 111A and second mobile robot 110B has repositioned to second robot staging station 110B. In some scenarios it may not be strictly necessary that each robot be assigned a particular robot staging station. For example, if the new positions of mobile robots 110C and 110B were reversed in FIG. 11, they may still be well-positioned to perform tasks in production area 236 if needed. However, in the arrangement depicted in FIG. 10, second mobile robot 110B was blocking the path of third mobile robot 110C to first robot staging station 111A, and would have continued to block the path had second mobile robot 110B been repositioned to first robot staging station 111A. Accordingly, robotics staging system 233 deliberately operated output device 113B of second robot staging station 111B to summon second robot 110B, so that it would move out of the way of third mobile robot 110C.

Suppose fourth mobile robot 110D, equipped with its special sensor package 115B, has become fully charged but is not likely to be needed for some time. Rather than leaving fourth mobile robot 110D in third robot staging station 111C, where it blocks both robot staging stations 111D and 111E from production area 236, and blocks second robot 110B from various robot staging stations in robot staging area 105 opposite production area 236, fourth mobile robot 110D may be moved to another location so that it ceases being an impediment to other robots. For example, in FIG. 11, output device 113F of sixth (storage) robot staging station 111F is rendering the fiducial, "110D."

Figure 12:
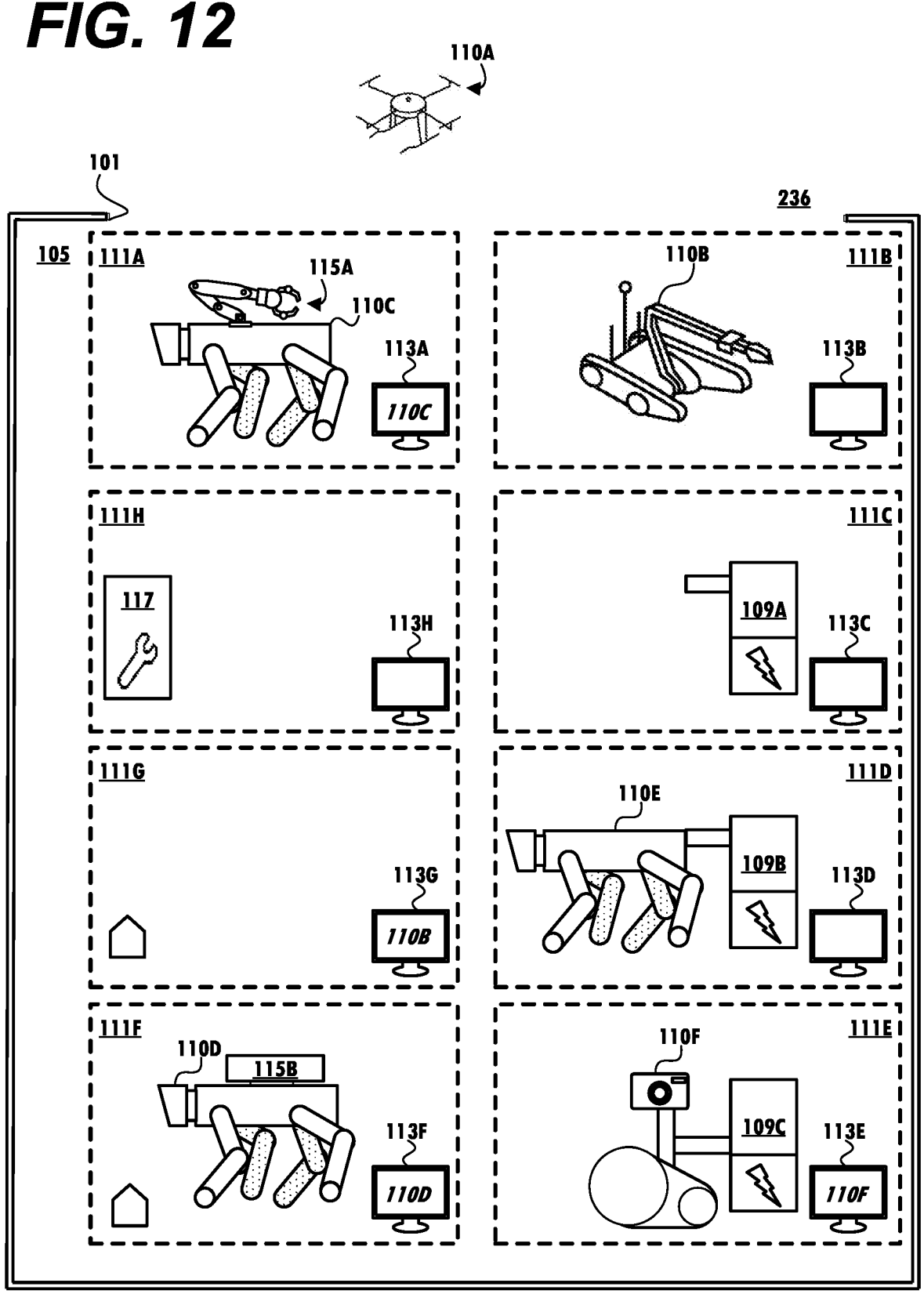

Consequently, in FIG. 12, fourth mobile robot 110D has vacated third robot staging station 111C in favor of sixth robot staging station 111F. Additionally, in FIG. 12, output device 113G associated with seventh robot staging station 111G now renders the fiducial, "110B." This may be because, for instance, second mobile robot 110B is being demoted in favor of fifth mobile robot 110E to respond to anomalies detected by first mobile robot 110A. For example, second mobile robot 110B may have been deployed to second robot staging station 111B because fifth mobile robot 110E was not yet fully charged and lacked the proper payload to respond to anomalies detected by first mobile robot 110A.

Figure 13:
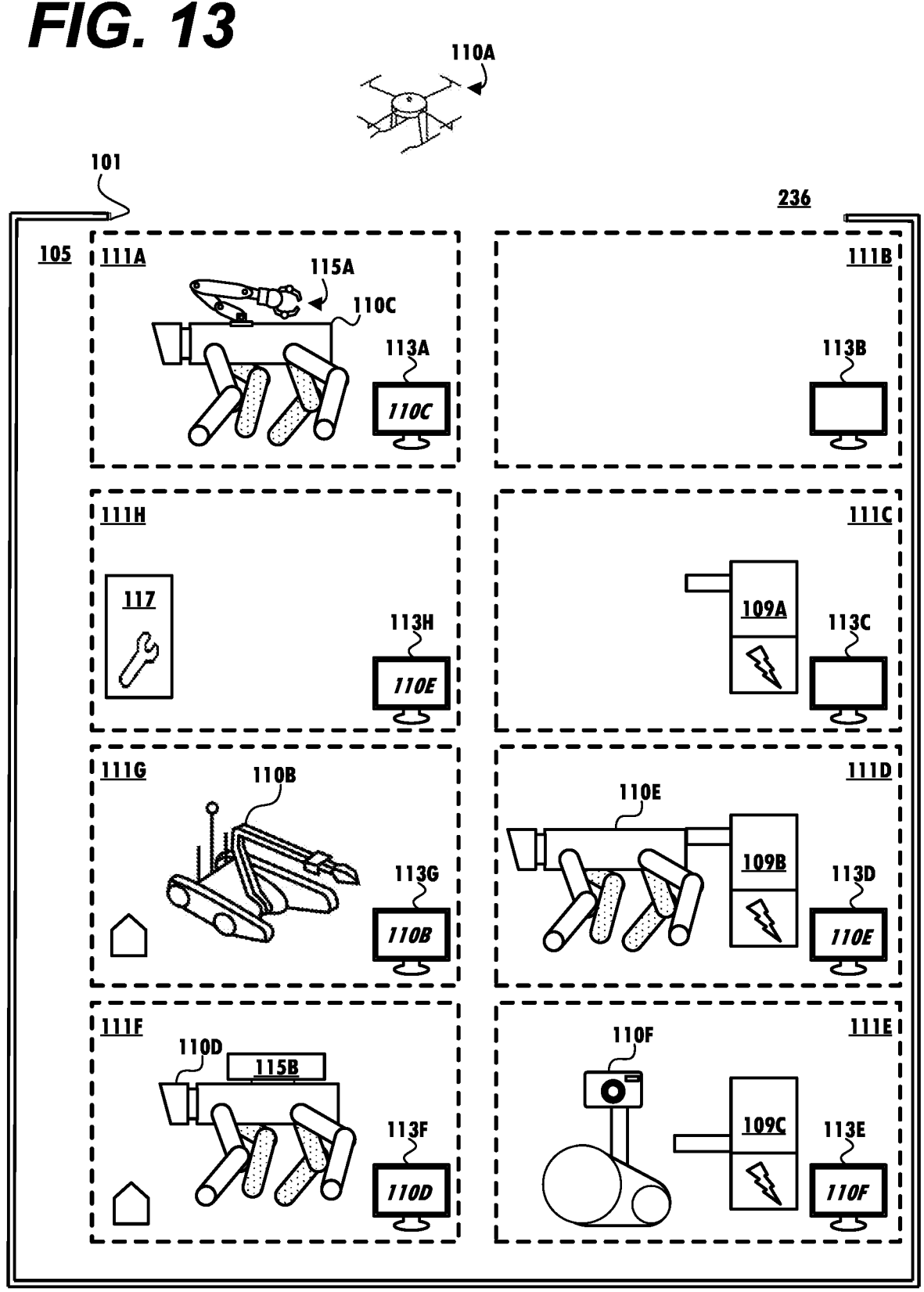
Figure 14:
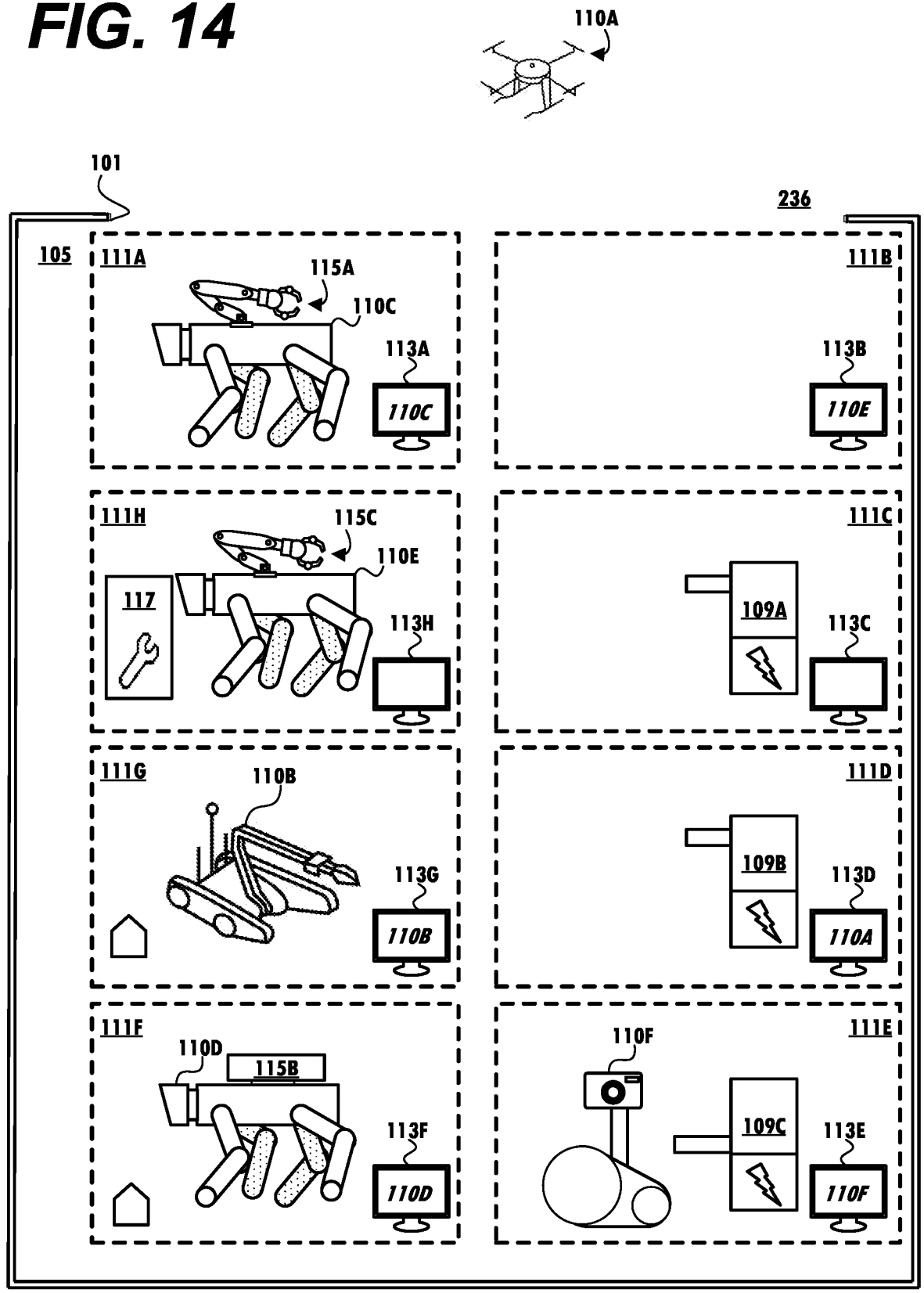

Accordingly, in FIG. 13, second mobile robot 110B has relocated to seventh robot staging station 111G. Additionally, output device 113H associated with eighth robot staging station 111H now renders the fiducial, "110E." This may cause fifth mobile robot 110E, now fully (or at least adequately) charged, to relocate to eighth robot staging station 111H, as depicted in FIG. 14. Meanwhile, in FIG. 13, sixth mobile robot 110F has been fully charged, and now has disconnected from charger 109C. However, sixth mobile robot 110F remains in fifth robot staging station 111E (which now effectively serves as a storage station), since sixth mobile robot 110F is still not needed and is already out of the way of other mobile robots.

In FIG. 14, fifth mobile robot 110E, now located in eighth robot staging station 111H, has been equipped with a new payload 115C, namely, a robot arm. It may be the case that robots having such robot arms, including third mobile robot 110C currently in first robot staging station 111A, are the preferred robot configuration for responding to anomalies detected by first mobile robot 110A. In any case, output device 113B associated with second robot staging station 111B now renders the fiducial, "110E." Consequently, in FIG. 15, fifth mobile robot 110E has relocated to second robot staging station 111B.

Figure 15:
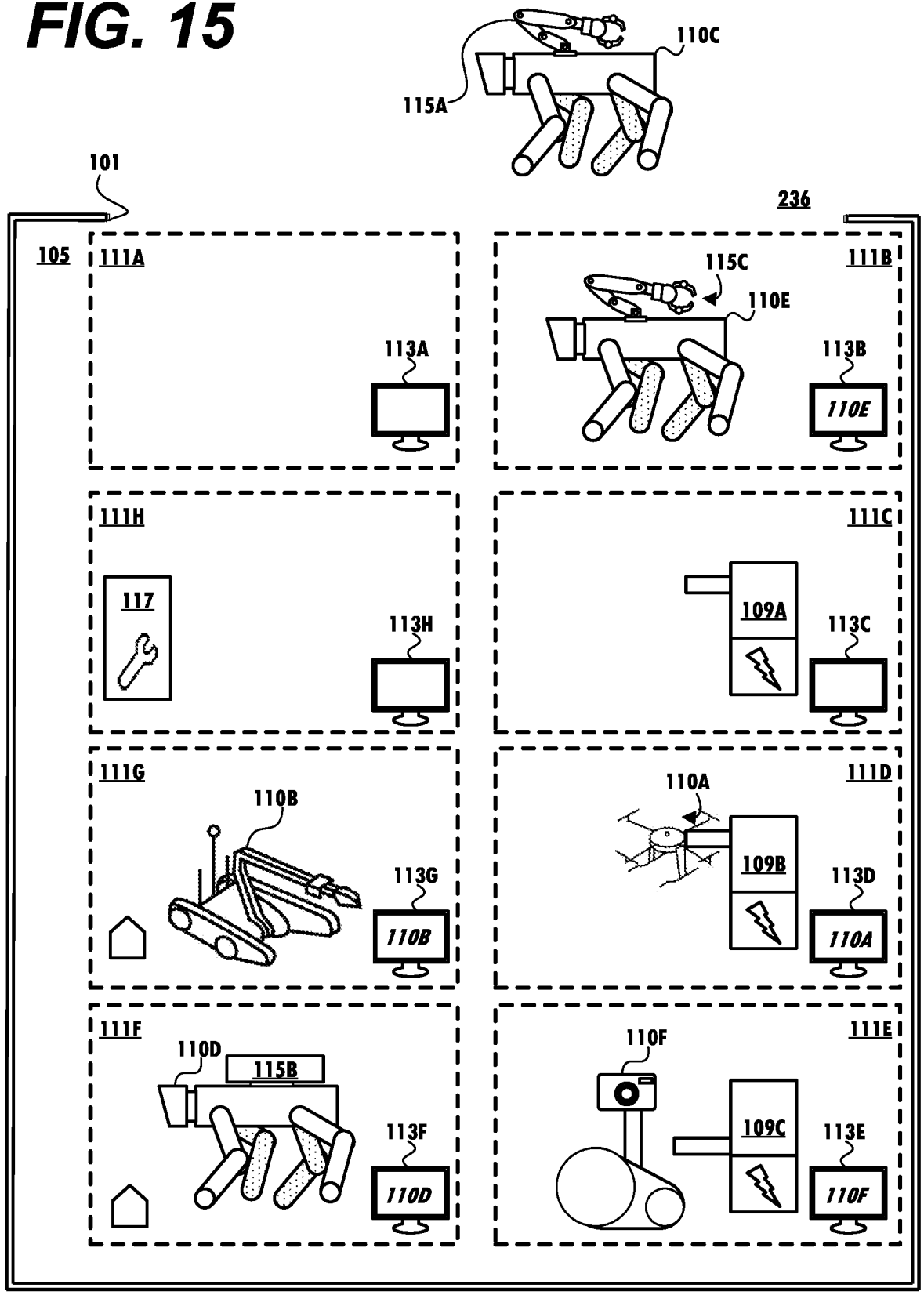

In FIG. 14, output device 113D associated with fourth robot staging station 111D renders the fiducial, "110A." This may facilitate first mobile robot 110A traveling from production area 236 to robot staging area 105, e.g., because it is low on batteries. In FIG. 15, first mobile robot 110A has relocated to fourth robot staging station 111D and is connected to charger 109B, which can be assumed to be compatible with multiple different types of mobile robots. If that weren't the case, first mobile robot 110A may have been summoned to a different robot staging station. Although its path to fourth robot staging station 111D was relatively clear, this may not be an issue since first mobile robot 110A is an airborne UAV. Additionally, fifth mobile robot 110E has relocated to second robot staging station 111B, e.g., to respond to requests from other mobile robots deployed in production area 236. For example, third mobile robot 110C has travelled into production area 236, e.g., to respond to an anomaly detected by first mobile robot 110A before it returned to fourth robot staging station 111D to recharge. Now, fifth mobile robot 110E stands ready to respond to requests, such as anomalies detected in production area 236 by third mobile robot 110C.

Referring back to FIG. 8, robotics staging system 233 may assign mobile robots to robot staging stations within robot staging area 105 in various ways. As described above, robotics staging system 233 may use any number of heuristics, such as robot charges falling beneath thresholds, robot performance quality (320 in FIG. 3) failing to meet standards, time intervals until a robot is potentially needed, etc., to efficiently and effectively assign robot staging stations to robots (or vice versa). However, the present disclosure is not limited to the use of heuristics for these purposes. In some implementations, various statistical techniques, such as machine learning models, may be used to determine where to assign an incoming robot.

Figure 16:
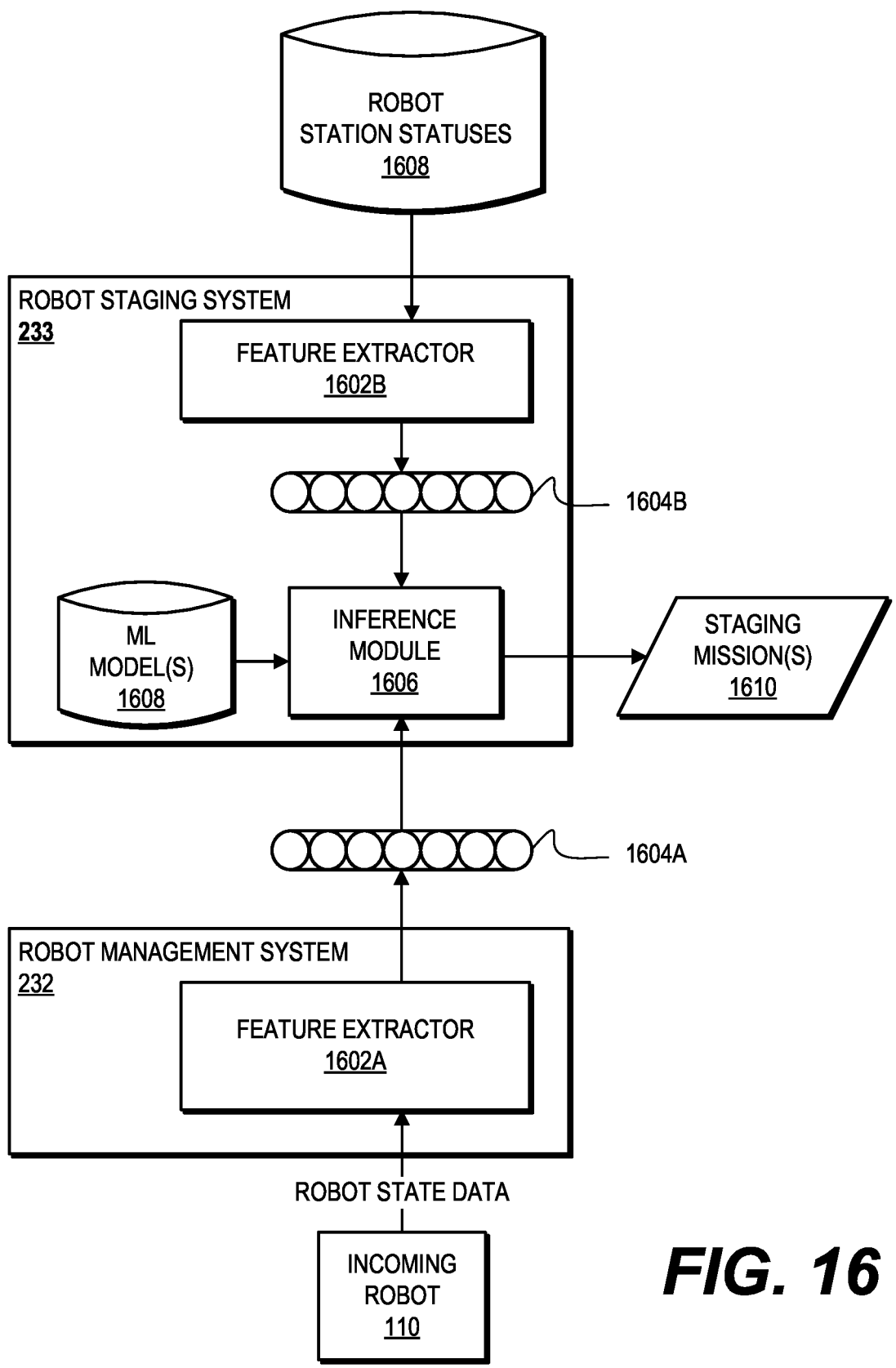
FIG. 16 demonstrates one example of how features of an incoming robot may be analyzed, along with features of robot staging stations and other features, to generate staging missions.

FIG. 16 schematically depicts one example of how robotics management system 232 and robotics staging system 233 may exchange data to facilitate orchestration by robotics staging system 233 of robot staging area 105. An incoming robot 110 transitioning to a staging mode, e.g., entering robot staging area 105, may provide (or robotics management system 232 may provide via processes 330, 340, 350) various robot state data. Examples of such robot state data may include for instance, data described in reference to FIG. 3, such as a current robot definition 305, robot capability 310, robot schedule 315, and/or robot performance metrics 320. More particularly, robot state data may include, for instance, battery level, performance quality, various health metrics, configuration data, tool status, etc. In some implementations, incoming robot 110 may push this robot state data to robotics management system 232. In other implementations, robotics management system 232 may query this data (e.g., via processes 330, 350, 350).

In any case, robotics management system 232 may include a first feature extractor 1602A that generates a first feature representation 1604A representing the state of the incoming robot 110. In some implementations, this feature representation 1604A may take the form of a feature vector with multiple dimensions, each corresponding to an attribute or feature of the incoming robot 110. In other implementations, this feature representation 1604A may take the form of a semantically-rich vector embedding, which may or may not be continuous. In this latter case, first feature extractor 1602A may be configured to apply one or more machine learning models, such as at least part of an autoencoder neural network model or transformer model, to the robot state data to generate the vector embedding.

The first feature representation 1604A may be provided to robotics staging system 233, in particular, to an inference module 1606. Meanwhile, a second feature extractor 1602B of robotics staging system 233 may query a database of robot staging station statuses 1608 to determine a state of the plurality of robot staging stations (e.g. 111A-H) within robot staging area 105. Similar to first feature extractor 1602A, second feature extractor 1602B may generate a feature representation 1604B of the state of the robot staging stations of robot staging area 105. As before, second feature extractor 1602B may or may not utilize one or more machine learning models, and feature representation 1604B may take the form of a feature vector or a vector embedding.

Inference module 1606 may process feature representations 1604A-B using one or more machine learning models 1608 to generate output 1610 indicative of staging mission(s) to be performed by one or more mobile robots, such as incoming robot 110 and/or other mobile robots already in robot staging area 105. Machine learning models 1608 may take various forms. In some implementations, machine learning models 1608 may include a reinforcement learning machine learning model or "policy" that is trained to process the states of the incoming robot and the plurality of robot staging stations (and production missions in some instances) to generate a probability distribution over a staging mission action space. The probability distribution may assign probabilities to various staging missions, which may include assigning particular mobile robots to particular robot staging stations. In various implementations, the reinforcement learning policy may be trained based on short term rewards (e.g., no immediate collisions) and/or long term rewards (e.g., one or more robots were able to complete production missions efficiently and without incident). Rewards may be determined in each iteration of the reinforcement learning policy by robotics staging system 233 and/or by robotics management system 232. Robotics management system 232 may determine rewards from sources such as robot performance analysis 340, or even from components associated with enterprise resource management 202, such as 224 or 228 in FIG. 2.

Based on these probabilities, one or more staging missions 1610 may be selected and assigned to one or more mobile robots 110 in robot staging area 105 and/or to the incoming robot 110. In some implementations where multiple robots from different vendors are being orchestrated, robotics staging system 233 may leverage the aforementioned robot-specific adapters 644 (see FIG. 6) to communicate mission parameters to individual robots.

Figure 17:
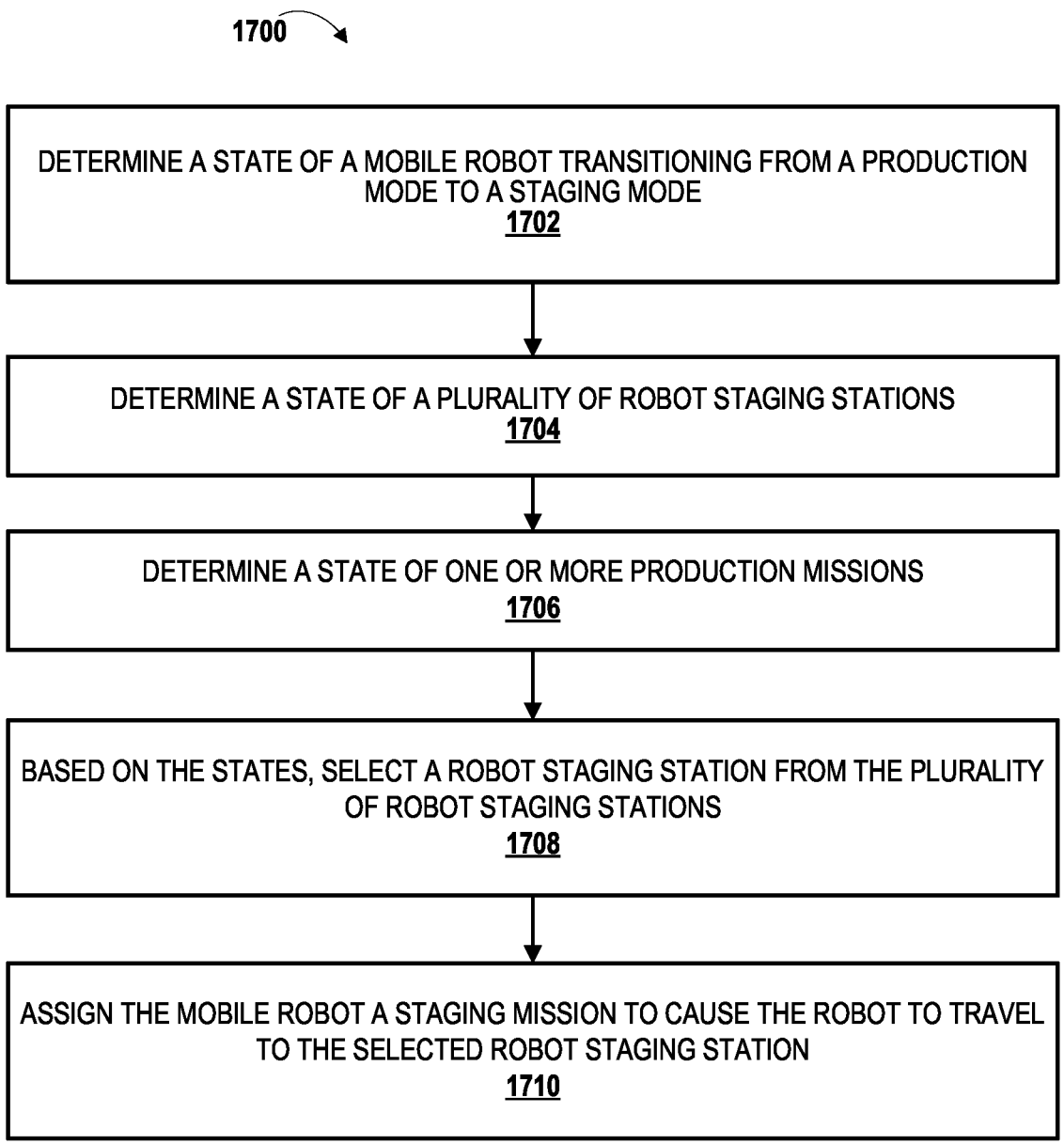
FIG. 17 illustrates an example method for performing selected aspects of the present disclosure.

FIG. 17 is a flowchart illustrating an example method 1700 for practicing selected aspects of the present disclosure, in accordance with implementations disclosed herein. While operations of method 1700 are shown in a particular order, this is not meant to be limiting. For convenience, the operations of FIG. 17 are described as being performed by a system, which may include robotics management system 232 and/or robotics staging system 233. One or more operations may be reordered, omitted or added.

At block 1702, the system, e.g., by way of robot resource management 330, robot performance analysis 340, and/or robot definition management 350, may determine a state of a mobile robot 110 transitioning from a production mode to a staging mode, e.g., when the robot physically relocates from a production area 236 of an industrial facility to robot staging area 105 of the industrial facility. For example, robotics management system 232 may query the incoming mobile robot—or leverage robot resource management 330, robot performance analysis 340, and/or robot definition management 350—for this information and pass it to robotics staging system 233, or robotics staging system 233 may itself query the incoming mobile robot. This robot state (e.g., 1604A in FIG. 16) may take various forms, such as a plurality of data points (e.g., an array or feature vector) related to the robot's health, configuration, battery status, job performance (e.g., determined using robot performance analysis 340), etc., a feature embedding (which may be continuous or discrete) that represents the same or similar data points in a semantically-rich, reduced dimensionality manner, etc.

At block 1704, the system may determine a state of a plurality of robot staging stations (e.g., 111A-H), e.g. within the robot staging area 105. The plurality of robot staging stations may include various types of stations, such as one or more charging stations, one or more maintenance stations, one or more storage stations (e.g., short term or long term), one or more mission starting location stations, retooling stations (if different than maintenance stations), etc. States of individual robot staging stations may vary depending on the type of station. For example, any robot staging station may have states such as occupied, vacant, reserved, unavailable/closed, etc. Robot staging stations in which maintenance is being performed on robots may include states such as firmware or software upgrade, physical maintenance, cleaning, retooling, maintenance successful, maintenance unsuccessful, additional maintenance required, etc. Charging robot staging stations may additionally have states such as charging, a level at which the current occupant robot is charged, time till the current occupant robot is charged, charge rate, charge adaptor type (e.g., charger compatibility or capability), etc.

Maintenance robot staging stations may include additional states such as the type(s) of maintenance or repair for which the station is configured, the types of mobile robots that can be maintained or repaired at the station, etc. Mission starting location stations may include attributes such as types of missions that can embark from those mission starting location stations, specific missions that can embark from those mission starting location stations, etc. Retooling robot staging stations (if distinct from maintenance robot staging stations) can include types of tools available, types of robots that are retoolable, etc.

In some implementations, at block 1706, the system may determine a state of one or more production missions (i.e., missions performed by mobile robots in production area 236), e.g., robot missions that are performable by or assigned to the incoming mobile robot, or even all robot missions that are active or queued up for performance. Production missions performed by mobile robots outside of robot staging area 105 in production area 236 may come in a variety of different forms. States of robot missions may include various information, such as a goal of the mission, a status of the mission, a scheduled start time or end time, tool(s) required to complete the mission, a predicted amount of power needed to perform the mission (robot agnostic or robot-specific), a predicted amount of time needed to perform the mission (again, robot agnostic or robot-specific), mission priority, etc.

Based at least in part on the determined states of the mobile robot and plurality of robot staging stations, and the state of the production missions, if determined, at block 1708, the system may select, for the incoming robot and/or another mobile robot in robot staging area 105, a robot staging station from the plurality of robot staging stations. As noted previously, this selection may be based on rules/heuristics and/or statistical models, such as reinforcement learning policies.

For instance, if there are no production missions available or assigned to the mobile robot, or if a production mission is assigned but scheduled for more than some time interval in the future, and a storage robot staging station is available, that storage robot staging station may be selected for the incoming robot. In some implementations, the robot staging station may be selected based on a time interval prior to a starting time of one or more production missions that are performable by or assigned to the mobile robot satisfying a minimum threshold. If the next available or assigned production mission is more than a certain amount of time in the future, then it may be beneficial to select a storage robot staging station, so that the mobile robot can move out of the way of other busier mobile robots. Or, even if the mobile robot has sufficient charge and/or is suitably configured (e.g., is equipped with the correct tool or end effector) to perform its next production mission, if that next production mission is scheduled more than a certain amount of time in the future, a charging and/or maintenance robot staging station may be selected, e.g., to fully charge the mobile robot and/or to perform various routine maintenance in the robot's downtime.

Storage robot staging stations may be used to solve more immediate challenges as well. For instance, in some implementations, a storage station may be selected based on the storage station being outside a present or future travel trajectory of one or more other mobile robots in the robot staging area. Additionally or alternatively, in some implementations, when a potential interference between two mobile robots is predicted, a cost/benefit analysis may be performed, e.g., by robotics staging system 233, to determine whether to relocate a first mobile robot to a storage station or cause a second mobile robot to alter its present or future trajectory to circumvent the first mobile robot. Such interference may include any impact on the capabilities of one or more of the mobile robots, such as a collision between the mobile robots, an obstruction of robot mobility, or interference of communication or sensor systems, etc. The cost/benefits analysis may take into consideration costs such as power required by each robot for each option, demand for robot storage stations, etc. The cost/benefits analysis may take into consideration benefits such as time gained by moving a robot out of the way of another robot temporarily, rather than to a storage station, or by allowing the robots to rely on their own native collision avoidance capabilities to work around each other.

In various implementations, when there is a particular production mission that is performable and/or assigned to the mobile robot, the mission may be ready to be performed now or within a predetermined time interval, or the mobile robot may need to be in a position to perform the production mission on demand (e.g., in dependence on another robot's performance of its own task). In either case, a robot staging station that is eligible as a starting location for the particular production mission may be selected.

As demonstrated by FIGS. 9-15, in some implementations, a robot staging station may be selected based on a determination that a first production mission is to be performed by a first mobile robot conditionally in dependence on a second production mission that is or will be performed by a second mobile robot. For example, the second production mission may be an inspection of a component of the industrial facility. In such a scenario, the first production mission may include one or more tasks that are performed conditionally based on an outcome of the inspection of the component. For example, if the second mobile robot discovers, while performing the second production mission, that a pipe or valve is blocked, but itself lacks tools to alleviate the blockage, the first mobile robot may be deployed to take remedial action. To enable the first mobile robot to perform this task as quickly as possible, the first mobile robot may be assigned to a robot staging station that is an eligible starting point for a production mission that includes taking remedial action. To be "eligible" to be a starting point for a robot mission, a robot staging station may be at a position within robot staging area 105 that is more proximate production area 236 than at least some other robot staging stations, e.g., so that a mobile robot assigned to that station is less likely to be obstructed from entering production area 236.

Referring back to FIG. 17, at block 1710, the system may assign the mobile robot a staging mission. The staging mission (e.g., a digital file, digital message, one or more commands, etc.) may include data that when processed by the robot, causes the mobile robot to travel to the selected robot staging station. To facilitate the mobile robot travelling to the selected robot staging station, in some implementations, at block 1710, the system may cause an output device at the selected robot staging station to render fiducial output. For example, in FIGS. 9-15, output devices 113A-H include displays that rendered visual fiducials. In such implementations, the staging mission may cause the mobile robot to: scan the plurality of robot staging stations (e.g., 111A-H) within robot staging area 105 to detect the rendered fiducial output, and travel to the robot staging station at which the rendered fiducial output is detected.

In some instances, a mobile robot may need to be cycled through multiple robot staging stations before performing a production mission, e.g., so that the robot can be maintained, charged, and/or retooled. In some implementations, a single staging mission may cause the mobile robot to travel to a sequence of robot staging stations, e.g., in a particular order or as the stations become available. Alternatively, the mobile robot may be assigned multiple staging missions, which the mobile robot may be required to perform in a particular order or may be free to perform in any order, e.g., as robot staging stations become available.

In any case, before, during, and/or after performing a first staging mission, in various implementations, based on the states of the mobile robot and plurality of robot staging stations, and further based on a given production mission of the production missions assigned to the mobile robot (or the state of multiple robot missions, where applicable), one or more additional robot staging stations may be selected from the plurality of robot staging stations within the robot staging area. Where applicable, one or more additional output devices may be operated at the one or more additional robot staging stations to render one or more additional fiducial outputs. The mobile robot may be assigned one or more additional staging missions, in addition to the first staging mission. The one or more additional staging missions may cause the mobile robot to, prior to performing the given production mission: scan the plurality of robot staging stations within the robot staging area to detect the one or more additional fiducial outputs, and travel to the one or more robot staging stations at which the one or more rendered fiducial outputs are detected.

Figure 18:
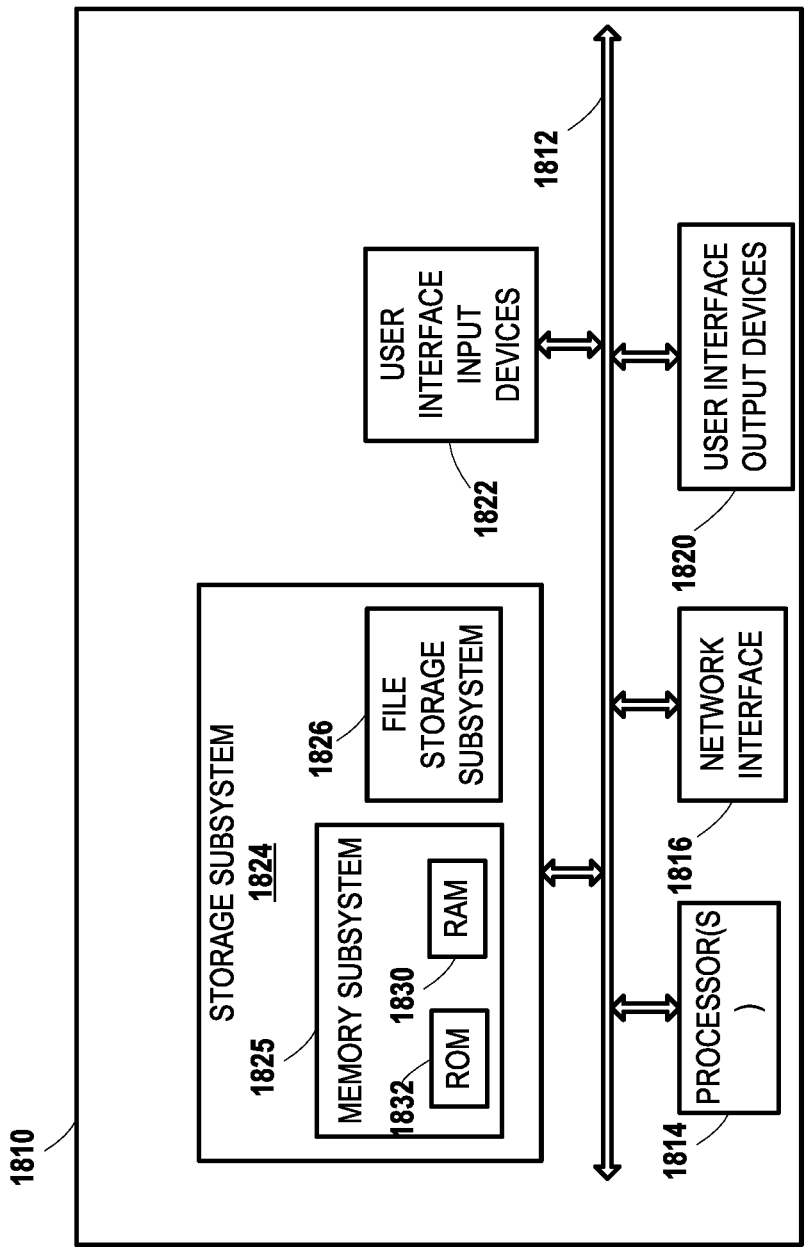
FIG. 18 schematically illustrates an example computer architecture on which selected aspects of the present disclosure may be implemented.

FIG. 18 is a block diagram of an example computing device 1810 that may optionally be utilized to perform one or more aspects of techniques described herein. Computing device 1810 typically includes at least one processor 1814 which communicates with a number of peripheral devices via bus subsystem 1812. These peripheral devices may include a storage subsystem 1824, including, for example, a memory subsystem 1825 and a file storage subsystem 1826, user interface output devices 1820, user interface input devices 1822, and a network interface subsystem 1816. The input and output devices allow user interaction with computing device 1810. Network interface subsystem 1816 provides an interface to outside networks and is coupled to corresponding interface devices in other computing devices.

User interface input devices 1822 may include a keyboard, pointing devices such as a mouse, trackball, touchpad, or graphics tablet, a scanner, a touch screen incorporated into the display, audio input devices such as voice recognition systems, microphones, and/or other types of input devices. In general, use of the term "input device" is intended to include all possible types of devices and ways to input information into computing device 1810 or onto a communication network.

User interface output devices 1820 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 1810 to the user or to another machine or computing device.

Storage subsystem 1824 stores programming and data constructs that provide the functionality of some or all of the modules described herein. For example, the storage subsystem 1824 may include the logic to perform selected aspects of the methods of FIG. 17, as well as to implement various components depicted in FIGS. 1-8 and 16.

These software modules are generally executed by processor 1814 alone or in combination with other processors. Memory 1825 used in the storage subsystem 1824 can include a number of memories including a main random access memory (RAM) 1830 for storage of instructions and data during program execution and a read only memory (ROM) 1832 in which fixed instructions are stored. A file storage subsystem 1826 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 1826 in the storage subsystem 1824, or in other machines accessible by the processor(s) 1814.

Bus subsystem 1812 provides a mechanism for letting the various components and subsystems of computing device 1810 communicate with each other as intended. Although bus subsystem 1812 is shown schematically as a single bus, alternative implementations of the bus subsystem may use multiple busses.

Computing device 1810 can be of varying types including a workstation, server, computing cluster, blade server, server farm, or any other data processing system or computing device. Due to the ever-changing nature of computers and networks, the description of computing device 1810 depicted in FIG. 9 is intended only as a specific example for purposes of illustrating some implementations. Many other configurations of computing device 1810 are possible having more or fewer components than the computing device depicted in FIG. 9.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented using one or more processors and comprising:
   determining a state of a mobile robot transitioning from a production mode to a staging mode;
   determining a state of a plurality of robot staging stations, wherein the plurality of robot staging stations includes at least one each of a charging station and a maintenance station;
   determining a state of one or more production missions that are performable by or assigned to the mobile robot, or that are assignable to one or more other mobile robots in a robot staging area that includes at least some of the plurality of robot staging stations;
   based at least in part on the determined states of the mobile robot and plurality of robot staging stations, as well as the state of the one or more production missions, selecting a robot staging station from the plurality of robot staging stations; and
   assigning the mobile robot a staging mission, wherein the staging mission causes the mobile robot to travel to the selected robot staging station.

2. The method of claim 1, further comprising causing an output device at the selected robot staging station to render fiducial output, wherein the staging mission causes the mobile robot to:
   scan the plurality of robot staging stations to detect the rendered fiducial output, and
   travel to the robot staging station at which the rendered fiducial output is detected.

3. The method of claim 2, wherein the output device comprises a display, and the rendered fiducial output comprises a visual fiducial marker.

4. The method of claim 1, wherein the mobile robot transitions from the production mode to the staging mode when moving from a production area of an industrial facility to the robot staging area of the industrial facility that includes at least some of the plurality of robot staging stations.

5. The method of claim 1, wherein one or more of the production missions comprise one or more missions to inspect or service sensors or actuators of process automation components outside of the robot staging area.

6. The method of claim 1, wherein the selected robot staging station is selected based on being an available starting location of a first production mission of the production missions that is performable by or assigned to the mobile robot.

7. The method of claim 1, wherein the selecting includes comparing a time interval until a starting time of one of the production missions to a threshold.

8. The method of claim 1, wherein the mobile robot comprises a first mobile robot, and the selecting comprises selecting the robot staging station further based on a determination that a first production mission of the plurality of production missions is to be performed by the first mobile robot conditionally, in dependence on a second production mission of the plurality of production missions that is or will be performed by a second mobile robot.

9. The method of claim 8, wherein the second production mission comprises an inspection of a component of a process automation facility, and the first production mission comprises one or more tasks that are performed conditionally based on an outcome of the inspection of the component.

10. The method of claim 1, wherein the state of the robot includes available battery power of the robot and a configuration of the robot.

11. The method of claim 10, wherein at least one maintenance station within a robot staging area that includes at least some of the plurality of robot staging stations comprises a payload alteration station configured for altering the configuration of the mobile robot.

12. The method of claim 1, wherein the state of the mobile robot comprises a first vector embedding and the state of the plurality of robot staging stations comprises a second vector embedding.

13. The method of claim 12, further comprising processing the first and second vector embeddings based on a reinforcement learning policy to generate a probability distribution over a staging mission action space, wherein the selecting is based on the probability distribution.

14. A method implemented using one or more processors and comprising:
   determining a state of a mobile robot transitioning from a production mode to a staging mode;
   determining a state of a plurality of robot staging stations, wherein the plurality of robot staging stations includes at least one each of a charging station and a maintenance station;
   based at least in part on the determined states of the mobile robot and plurality of robot staging stations, selecting a robot staging station from the plurality of robot staging stations; and
   assigning the mobile robot a staging mission, wherein the staging mission causes the mobile robot to travel to the selected robot staging station;
   wherein the selected robot staging station comprises a storage station that is selected based on the storage station being outside a present or future travel trajectory of another mobile robot in a robot staging area that includes at least some of the plurality of robot staging stations.

15. The method of claim 14, further comprising performing a cost/benefit analysis to determine whether to relocate the mobile robot to the storage station or cause the another robot to alter the present or future trajectory of the another robot to circumvent the mobile robot.

16. A robotics staging system comprising one or more processors and memory storing instructions that, when executed by the one or more processors, cause the one or more processors to:
- receive, from a robotics management system, a state of a mobile robot transitioning from a production area of an industrial facility that is managed by the robotics management system to a robot staging area of the industrial facility that is managed by the robotics staging system;
- determine a state of a plurality of robot staging stations within the robot staging area, wherein the plurality of robot staging stations includes at least one each of a robot charging station and a robot production mission starting point station, and the state of the plurality of robot staging stations includes one or more robot staging stations that are occupied and one or more robot staging stations that are vacant;
- determine a state of one or more production missions that are performable by or assigned to the mobile robot, or that are assignable to one or more other mobile robots in the staging area;
- based at least in part on the determined states of the mobile robot and plurality of robot staging stations, as well as based on the state of the one or more production missions, select a robot staging station from the plurality of robot staging stations; and
- assign the mobile robot a staging mission, wherein the staging mission causes the mobile robot to travel to the selected robot staging station.

17. The robotics staging system of claim 16, wherein the instructions to select include instructions to:
- determine a time interval until a starting time of a given production mission of the production missions that is assigned to the mobile robot; and
- select the robot charging station as the selected robot staging station based on the time interval being sufficient to at least partially charge the mobile robot prior to the given production mission.

* * * * *